United States Patent [19]

Mairs et al.

[11] Patent Number: 5,874,960

[45] Date of Patent: Feb. 23, 1999

[54] METHOD AND SYSTEM FOR SHARING APPLICATIONS BETWEEN COMPUTER SYSTEMS

[75] Inventors: Christopher J. Mairs; Anthony M. Downes; Roderick F. MacFarquhar, all of London; Kenneth P. Hughes, East Sussex; Alex J. Pollitt; John P. Batty, both of London, all of England

[73] Assignees: Microsoft Corporation, Redmond, Wash.; Picturetel Corporation, Danvers, Mass.

[21] Appl. No.: 498,940

[22] Filed: Jul. 5, 1995

[51] Int. Cl.$^6$ .................................................. H04N 1/40
[52] U.S. Cl. ........................... 345/340; 345/339; 345/329
[58] Field of Search .................................... 345/340, 343, 345/352, 339, 326, 329, 333, 334, 335, 428; 358/298, 448; 382/209, 298; 395/112

[56] References Cited

U.S. PATENT DOCUMENTS

| | | | |
|---|---|---|---|
| 4,882,687 | 11/1989 | Gordon | 364/518 |
| 4,939,673 | 7/1990 | Hanau et al. | 345/443 |
| 5,206,934 | 4/1993 | Naef, III | 395/200 |
| 5,210,825 | 5/1993 | Kavaler | 395/147 |
| 5,255,361 | 10/1993 | Callaway et al. | 395/162 |
| 5,260,783 | 11/1993 | Dixit | 348/415 |
| 5,274,472 | 12/1993 | Williams | 358/455 |
| 5,408,600 | 4/1995 | Garfinkel et al. | 395/153 |
| 5,565,886 | 10/1996 | Gibson | 345/136 |
| 5,592,657 | 1/1997 | Johnson et al. | 395/500 |
| 5,689,343 | 11/1997 | Loce et al. | 358/298 |

OTHER PUBLICATIONS

Schroeder, Erica, "Videoconferencing—Creative brings Mac package to Windows," *PC Week*, vol. 11, No. 25, pp. 83 & 88, Jun. 27, 1994.

Intel Corporation, "Intel ProShare™ Personal Conferencing Software—Getting Started Guide," Chapter 4, pp. 25–31, 1994.

Schroeder, Erica, "PictureTel Plans Low–Cost Video App Sharing," *PC Week*, vol. 11, No. 25, pp. 1 & 171, Jun. 27, 1994.

"A Primer on the T.120 Series Standard," *DataBeam Corporation*, pp. 1–13, 1995.

Simpson, *Mastering WordPerfect® 5.1 & 5.2 For Windows™*, Sybex Inc., Alameda, Ca. 1993, Appendix B.

*Primary Examiner*—Raymond J. Bayerl
*Assistant Examiner*—Steven P. Sax
*Attorney, Agent, or Firm*—Seed and Berry LLP

[57] ABSTRACT

A method in a computer system for displaying data generated by a shared application on a host computer system on both a host display of the host computer system and a shadow display of a shadow computer systems The host computer system has a window manager for managing windows displayed on the host display. The shadow computer system has a window manager for managing windows displayed on the shadow display. Under control of the host computer system, a Share System executes the shared application. Then, the Share System registers a host window with the windowing system of the host computer system. Upon registration of the host window, the Share System sends a notification of registration of the host window to the shadow computer system. At the shadow computer system, the Share System receives the sent notification of registration of the host window. Upon receiving the sent notification of registration of the host window, the Share System registers a shadow window with the windowing system of the shadow computer system so that the window wing system of the shadow computer system can send messages to the shadow window and receive data to display in the shadow window.

27 Claims, 35 Drawing Sheets

METHOD AND SYSTEM FOR SHARING APPLICATIONS BETWEEN COMPUTER SYSTEMS

TECHNICAL FIELD

This invention relates generally to a computer method and system for sharing application programs and, more specifically, to a method and system for sharing application programs between a host computer system and a shadow computer system.

BACKGROUND OF THE INVENTION

The modern workplace is increasingly reliant on the use of networks. A network is a group of computer systems and associated devices that are connected by communications facilities. A network enables the transfer of electronic information between computer systems. Typically, each of the computer systems has local applications which may be invoked at that computer system. The local applications may receive input from a user at that computer system. Also, a local application displays output at that computer system.

It is useful for a user to be able to share an application invoked at a host computer system with another user at a shadow computer system. For example, sharing an application which generates a word processing document may assist an editor who is working with a writer to publish a document. In particular, the editor may wish to edit the document at the host computer system, while the writer views the document at the shadow computer system. In this manner, the writer may also provide input to the shared application and modify the document based on the editor's comments. Immediately, the editor may review this revised document. In addition, sharing an application may be useful for diagnostic testing by a technical person upon receiving questions from a user. For example, if the user has found that an application is not working properly, then the user may desire to share the application with the technical person. Then, the technical person can attempt to solve the problem, receiving input from the user describing the problem as needed.

Some conventional computer systems allow a user at a host computer system to share an application with a user at a shadow computer system. These conventional computer systems typically display the output of the shared application within a shadow window that is contained within a top-level window. The top-level window is created and controlled by the program that coordinates the sharing of the application. Unfortunately, because the shadow window is not a top-level window, the shadow window may not be minimized or maximized under the control of the operating system.

In addition, these conventional systems typically do not negotiate control of the shared application. Instead, either user may input data to the shared application, and all data is passed in to the application in the order it is entered. Moreover, typically, a user who is sharing an application may either view the application or control it (i.e., provide input to it). Conventional systems do not enable a user who is sharing an application to use non-shared applications. It may be useful, however, for a user to be able to use a non-shared application and still be able to view a shared application.

Also, various computer systems within a network may have differing display resolutions. For example, some computer systems may have a display resolution of 1024 by 768 pixels and other computer systems may have a display resolution of 640 by 480. Thus, it would be useful when sharing an application to accommodate the different display resolutions.

Furthermore, since the user of a shared application at the shadow computer system actually views the output in real time, it is important that the speed of transmission of the output data from the host to the shadow computer systems be optimized.

SUMMARY OF THE INVENTION

An aspect of the present invention is a Share System that provides a method in a computer system for displaying data generated by a shared application on a host computer system on both a host display of the host computer system and a shadow display of a shadow computer system. The host computer system has a window manager for managing windows displayed on the host display. The shadow computer system has a window manager for managing windows displayed on the shadow display. Under control of the host computer system, the Share System executes the shared application. Then, the Share System registers a host window with the windowing system of the host computer system. Upon registration of the host window, the Share System sends a notification of registration of the host window to the shadow computer system. At the shadow computer system, the Share System receives the sent notification of registration of the host window. Upon receiving the sent notification of registration of the host window, the Share System registers a shadow window with the windowing system of the shadow computer system so that the windowing system of the shadow computer system can send messages to the shadow window and receive data to display in the shadow window.

In another aspect of the present invention, the Share System provides a method in a computer system of coordinating z-ordering of shared windows on a host computer system with shadow windows on a shadow computer system. Each of the shared windows and each of the shadow windows have a one-to-one correspondence. The Share System first displays the shared windows on the host computer system with the shared windows having a z-ordering. Next, the Share System displays the shadow windows on the shadow computer system with the shadow windows having a z-ordering. When the z-ordering of the shared windows is modified at the host computer system, the Share System sends a notification to the shadow computer system. Upon receiving the sent notification, the Share System at the shadow computer system modifies the z-ordering of the shadow windows in accordance with the z-ordering of the shared windows.

In another aspect of the present invention, the Share System provides a method in a computer system for establishing input control of a shared application executing on a host computer system. The shared application has output that is displayed on both a host display of the host computer system and a shadow display of a shadow computer system. Input control indicates whether the shared application is to receive input exclusively from the host computer system or exclusively from the shadow computer system. Initially, the input control is with the host computer system. The Share System detects that a user of the shadow computer system is requesting that the shadow computer system be given input control. The Share system sends a request to the host computer system that input control be changed to the shadow computer system. Then the Share System at the host computer system receives the sent request that input control be changed to the shadow computer system. Next, the Share System changes input control to the shadow computer system so that input generated by the user of the shadow computer system is sent to the shared application and input generated by a user of the host computer system is not sent to the shared application.

In another aspect of the present invention, the Share System provides a method for detaching a computer system from input control of a shared application executing on a host computer system. The shared application has output data that is displayed on the host computer system and a shadow computer systems. The Share System first receives an indication from a user at the host computer system to detach from input control of the shared application. Then upon receiving changes to the output data from the shared application, the Share System updates the displayed output data on both the host and the shadow computer systems. Upon receiving input directed by the user of the host computer system, the Share System sends the input to the shared application. Upon receiving input directed by the user of the shadow computer system to the shared application, the Share System discards the received input without sending it to the shared application.

In another aspect of the present invention, the Share System provides a method in a computer system for resolving display resolution differences between a host computer system and a shadow computer system. The host computer system executes a shared application that displays output. The output is displayed on both a host display of the host computer system and a shadow display of the shadow computer system. The host display has a host display resolution and the shadow display has a shadow display resolution. First, the Share System determines whether the host display resolution or the shadow display resolution is higher. Then, the Share System simulates the higher resolution on the computer system with the lower resolution by establishing a virtual display with the higher resolution, by displaying a viewport of the lower display resolution into the virtual display, and by scrolling the viewport to reflect a current cursor position within the display with the higher display resolution.

DETAILED DESCRIPTION OF THE INVENTION

Figure 1:
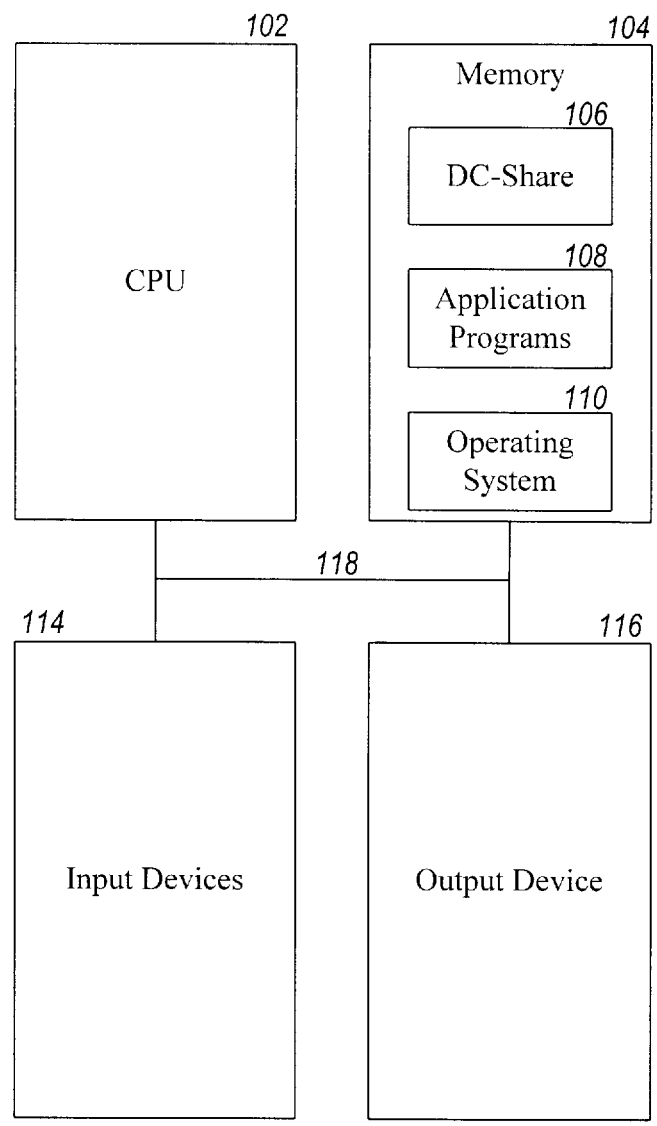
FIG. 1 is a block diagram of a computer system on which the Share System executes.

FIG. 1 is a block diagram of a computer system on which the Share System executes. The computer system includes a central processing unit (CPU) 102, a memory 104, input devices 114, and an output device 116. The input devices are preferably a keyboard and a mouse, and the output device is preferably a display device, such as a CRT. The CPU, memory, input devices, and output device are interconnected by bus 118. The memory contains application programs 108, the Share System 106, and an operating system 110. In a preferred embodiment, the operating system is Windows of Microsoft Corporation. The architecture of the Windows operating system is fully described in "Programming Windows 3.1" by Charles Petzold, Microsoft Press, 1992, which is hereby incorporated by reference.

Figure 2:
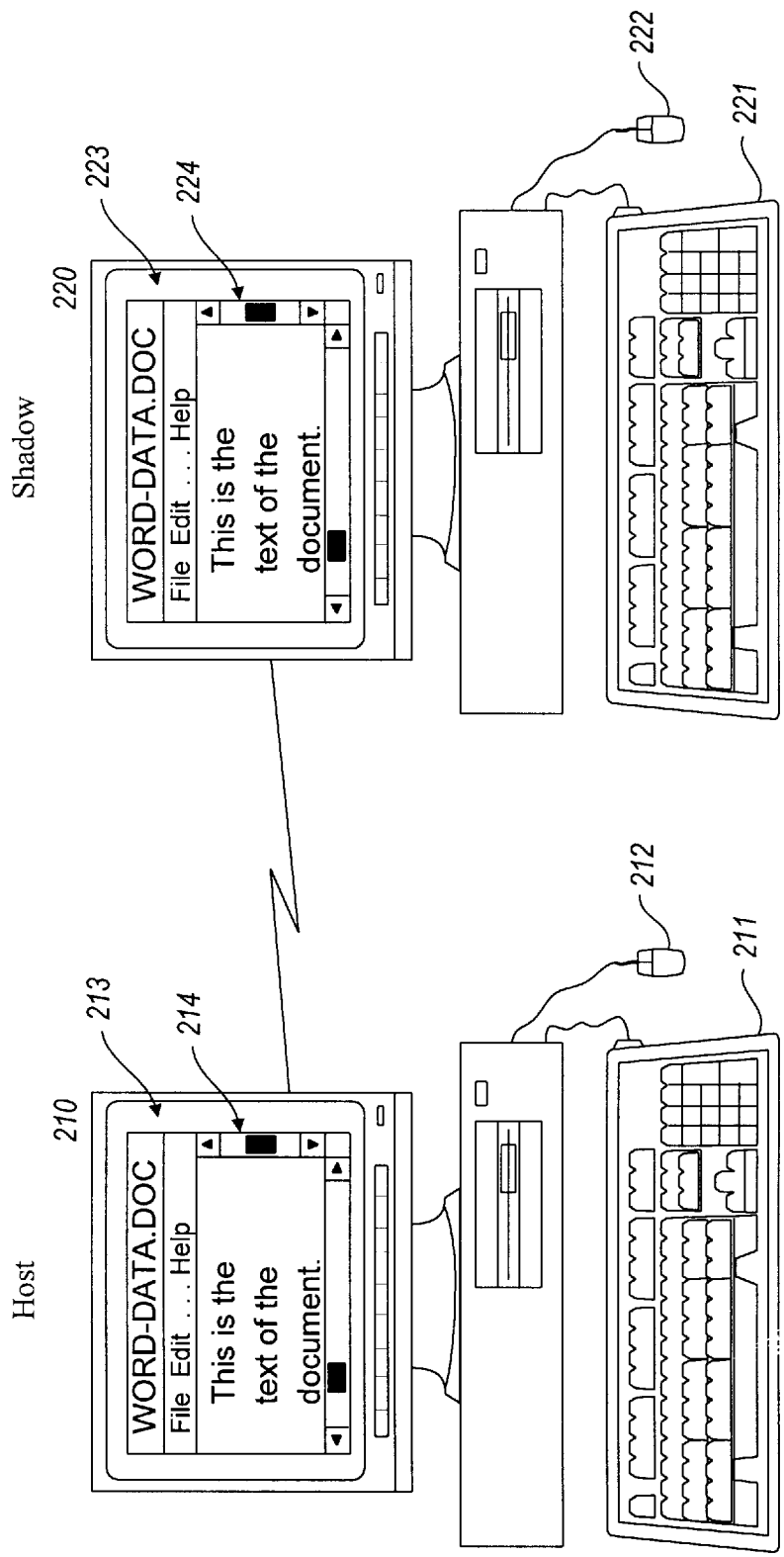
FIG. 2 is a diagram illustrating the sharing of an application program under control of the Share System.

FIG. 2 is a diagram illustrating the sharing of an application program under control of the Share System. The host computer system 210 includes a keyboard 211, a mouse 212, and a display 213. The display 213 shows the host window 214 for the application program that is being shared (the "shared application"). In this example, the application program entitled "WORD" is being shared and is executing on the host computer system. The data of the shared application output is being displayed in a host window 214. The Share System intercepts the output data of the shared application that is directed to the host window 214. The Share System transmits the intercepted output data to the shadow computer system 220. The Share System also forwards the intercepted output data to the operating system of the host computer system to be displayed in a normal manner within host window 214. The shadow computer system includes a keyboard 221, a mouse 222, and a display 223. When the shadow computer system receives the intercepted output data, the Share System of the shadow computer system creates a shadow window 224 that corresponds to the host window 214 and that is registered with the operating system of the shadow computer system. The Share System then forwards the intercepted output data to operating system of the shadow computer system for display in the shadow window 224. Thus, all output data of the shared application is displayed on both the host and shadow computer systems.

In addition, the Share System allows a user of either the host computer system or the shadow computer system to input data to the shared application. A user inputs data by first "taking control" of the shared application. For example, a user of the shadow computer system can click a mouse button to take control of the shared application. The user can then enter data using keyboard 221. The Share System of the shadow computer system intercepts the input data and transmits the input data to the Share System of the host computer system. The Share System of the host computer system forwards intercepted input data to the operating system of the host computer system, which sends the input data to shared application for processing as if the input data had been entered on keyboard 211. When the shared application outputs data to host window 214 in response to receiving the input data, the Share System of the host computer system intercepts the output data and transmits the intercepted output data to the Share System of the host computer system, which updates shadow window 224 as described above. Similarly, when a user of the host computer system takes control and inputs data through keyboard 211 or mouse 212, the Share System of the host computer system forwards the input data to the operating system of the host computer system, which sends the input data to the shared application for processing as normal. Thus, to a user of the shadow computer system, the shared application looks as though it is executing on the shadow computer system.

Figure 3:
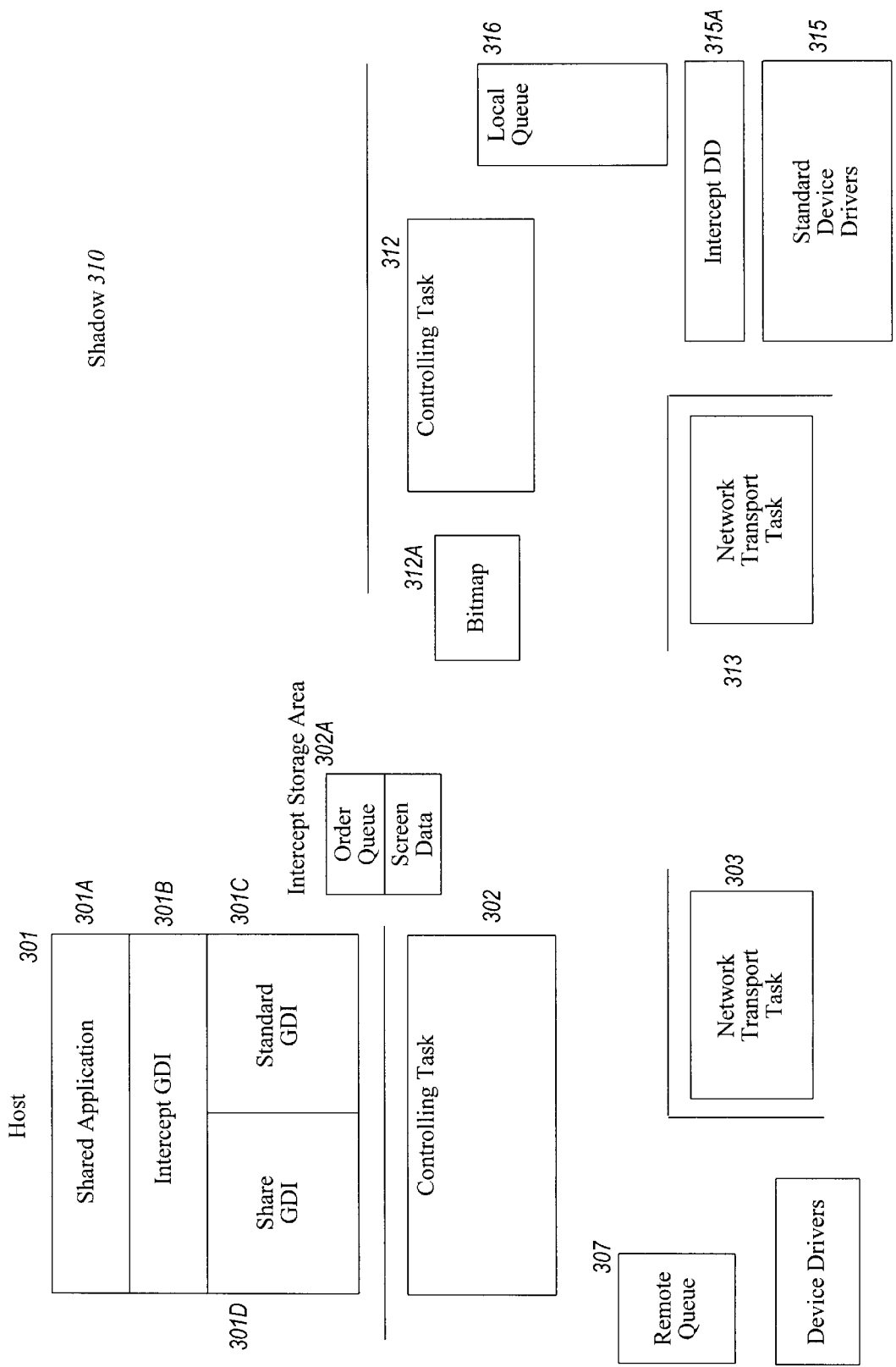
FIG. 3 is a block diagram of the architecture of the Share System executing on both the host and shadow computer systems.

FIG. 3 is a block diagram of the architecture of the Share System executing on both the host and shadow computer systems. The function of the Share System is divided into three tasks that execute on the host computer system and two tasks that execute on the shadow computer system. On the host computer system, the first task corresponds to the execution of the shared application 301, the second task corresponds to the execution of a controlling task 302, and the third task corresponds to the execution of a network transport task 303. When the Share System is initially installed on the host computer system, the Share System inserts various hooks in the operating system to allow the Share System to intercept input and output data and to forward intercepted data to the operating system.

In the following, an overview of aspects of the preferred operating system is described that relate to the installation of the hooks. In the described embodiment, the hooks are installed on a computer system operating under the control of the Windows operating system. Other operating systems typically provide mechanism for intercepting input and output data. Thus, one skilled in the art would appreciate that the principles of the present invention can be used in conjunction with differing operating systems. The Windows operating system provides a standard graphical device interface (GDI) layer, which is used by applications to output data to display devices, and a standard device driver (DD) layer, which is used to handle device interrupts. The standard GDI layer provides various functions that can be called by an application program to output data to a display device. For example, the standard GDI layer may provide a function for displaying a specified string of text at a specified display location in a specified font. The standard GDI layer is typically linked at run time into the address space of each application program that calls its functions. The standard DD layer provides various device drivers to handle interrupts and to forward input data to the operating system.

To intercept output data, the Share System installs an intercept GDI layer 301B in place of the standard GDI layer 301C provided by the operating system. The intercept GDI layer provides an intercept function for each function of the standard GDI layer. Each intercept function has a prototype that is identical to the prototype of the corresponding standard function. In this way, a shared application 301A (actually all applications whether shared or not) is linked to the intercept GDI layer when the application is loaded, rather than the standard GDI layer. Thus, all calls directed to the standard GDI layer are actually calls to the intercept GDI layer. The called intercept GDI function either calls to the corresponding standard GDI function or calls a share GDI layer 301D provided by the Share System. The share GDI layer contains a function for each function of the standard GDI layer that the Share System needs to intercept. (The Share System would not need to intercept a GDI function that only returns status information.) The share GDI functions store data describing the called GDI function and its parameters in an intercept storage area 302A. The share GDI function also invokes the corresponding standard GDI function to the output data to the host window.

Periodically, the controlling task 302 receives control. The controlling task retrieves the data stored on the intercept storage area and packets the data for transmission to the shadow computer system. The packeted data is forwarded to the network transport task 303. The network transport task 303 then transmits the packeted data to the shadow computer system 310. The network transport task 313 of the shadow computer system receives the packeted data and forwards it to the controlling task 312 of the shadow computer system, which unpackets the data and controls the displaying of the output data in the shadow window.

To support displaying the output data, the shadow computer system maintains a shadow bitmap 312A. The shadow bitmap contains an in memory copy of the shared window of the host computer system. All updates to the host window are reflected in both the shadow bitmap and the shadow window. The shadow bitmap is used for handling "paint" messages received from the operating system of the shadow computer system. The operating system sends a paint message to a window (via a window procedure for the window) whenever a portion of the window that was previously obscured and has now become visible. The window is responsible for repainting the now visible portion. Thus, whenever a paint message is received by the shadow window, the shadow window retrieves the output data for the repaint from the shadow bitmap. Thus, when the controlling task receives output data it stores the data in the shadow bitmap and notifies the operating system that the displayed shadow window (or a portion of it) is no longer valid. The operating then generates a "paint" message that is sent to the shadow window. When the shadow window receives the paint message, the shadow window is updated.

The Share System installs an intercept DD layer 315A to intercept calls from the standard DD layer 315 to the operating system. When a user of the shadow computer system inputs data for the shared application, the standard device driver for the input device is executed which calls the intercept DD layer.

The intercept device driver stores the input data into a local queue and forwards the interrupt to the operating system to process the input data as normal by generating a message to send to the shadow window describing the input data.

The controlling task intercepts all messages generated by the operating system that are directed to an application program. When a message is intercepted that is directed to the shadow window, the controlling task 312 retrieves the corresponding input data from the local queue that caused the intercepted message to be generated. The controlling task then packets the input data and forwards the packeted input data to the network transport task 313. The network transport task then transmits the packeted input data to the network transport task 303 of the host computer system. The network transport task 303 forwards those packeted input data to the controller task 302 of the host computer system. The controlling task stores the input data in a remote queue 307. The controlling task 302 retrieves the input data from the remote queue 307 forwards the input data to the operating system. The operating system then generates messages corresponding to the input data and sends the messages to the host window. In this way, the shared application treats input data entered on the shadow computer system as if they were generated locally at the host computer system.

Figure 4:
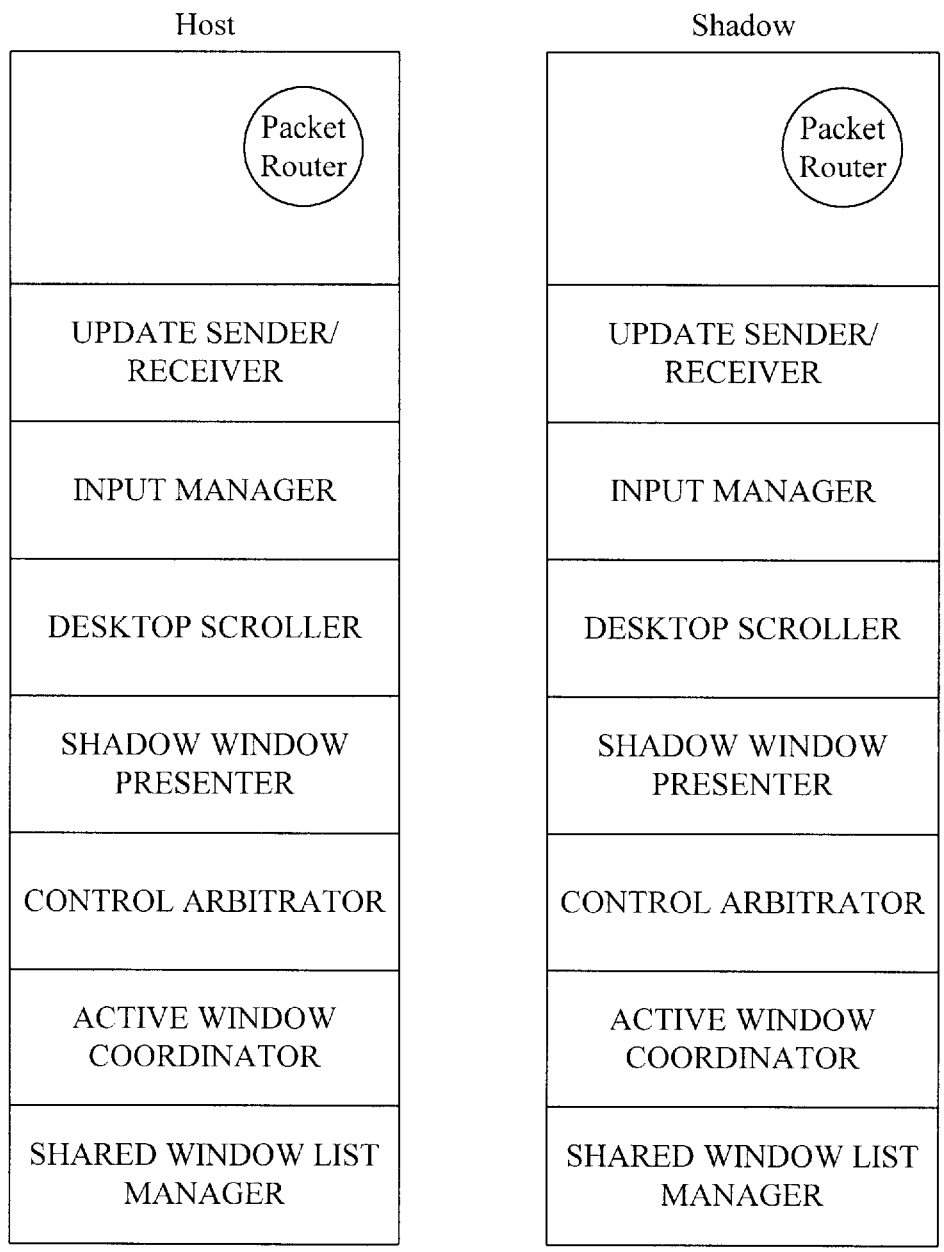
FIG. 4 is a block diagram illustrating the components of the controlling tasks.

FIG. 4 is a block diagram illustrating the components of the controlling tasks. The controlling tasks contain several components: a packet router, update sender/receiver, input manager, desktop scroller, shadow window presenter, control arbitrator, active window coordinator, and shared window list manager. Since the Share System on both the host computer system and the shadow computer system have the same components, the computer systems can function as both a host computer system and a shared computer system simultaneously. That is, a computer system can be executing a shared application and displaying a shadow window of another shared application program that is executing on a another computer system. The network transport task receives network messages and forwards the message to the packet router. The packet router processes messages relating to input and output data by invoking the appropriate other components to handle the messages. The patent application U.S. patent application Ser. No. 08/498,329, entitled "Method and System for Transmitting Data for a Shared Application," which was filed concurrently with the present application describes these components in more detail, and is hereby incorporated by reference.

Figure 5:
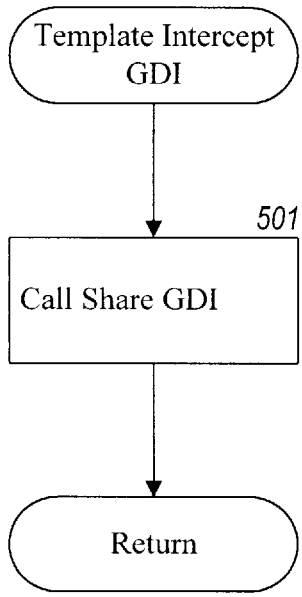
FIG. 5 is a flow diagram of a template for the intercept GDI functions.

FIG. 5 is a flow diagram of a template for the intercept GDI functions. For each function of the standard GDI layer, the intercept GDI layer contains a corresponding function with the same prototype. The intercept GDI functions either invoke the corresponding share GDI function or standard GDI function. If the Share System needs to intercept the GDI function, then the intercept GDI function invokes the share GDI function passing the parameters it was passed. Otherwise, the intercept GDI function invokes the standard GDI function passing the parameter it was passed. The intercept GDI function then returns.

Figure 6:
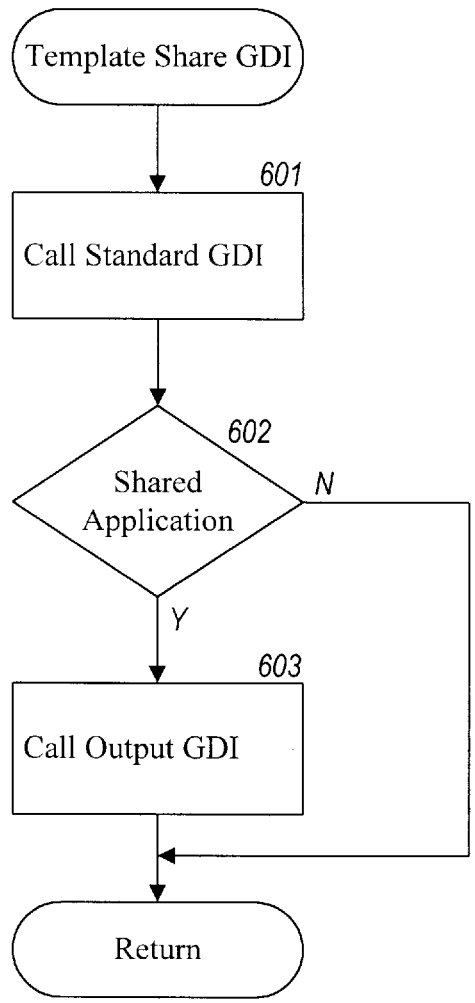
FIG. 6 is a flow diagram of a template for the share GDI functions.

FIG. 6 is a flow diagram of a template for the share GDI functions. The share GDI functions store output data in the intercept storage area in the form of "orders" or "screen data" and call the corresponding standard GDI function to send the output data to the host window as normal. In step 601, the share GDI function invokes the corresponding standard GDI function passing the parameters that it was passed. In step 602, if the GDI function is being invoked by a shared application, then the function continues at step 603, else the function returns. Recall that since the intercept GDI layer replaces the standard GDI layer all applications are linked into the intercept GDI layer whether shared or not. In step 603, the share GDI function calls the Output GDI routine, which stores output data in the intercept storage area and returns.

Figure 7:
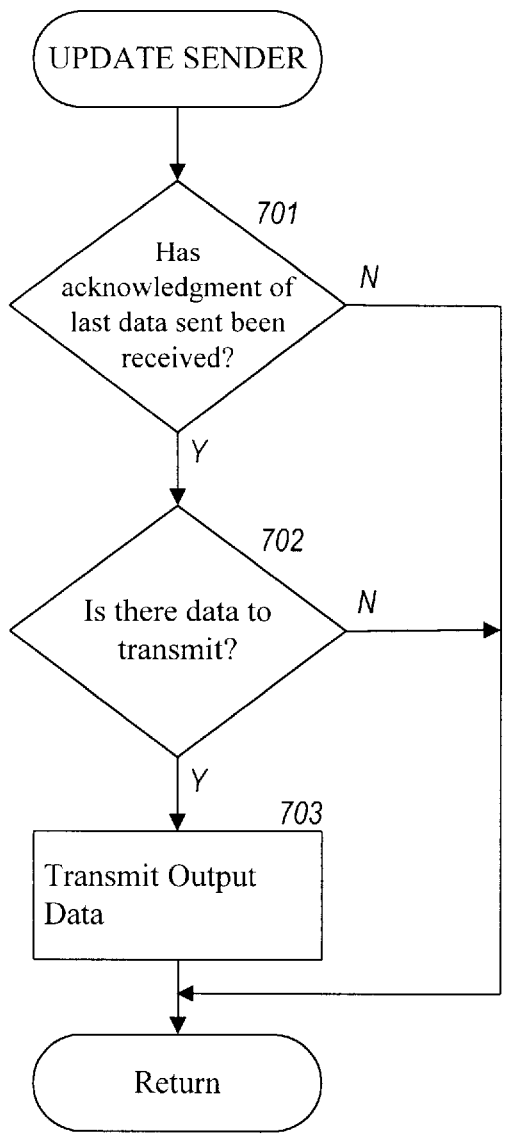
FIG. 7 is a flow diagram of the Update Sender portion of the Update Sender/Receiver component.

FIG. 7 is a flow diagram of the Update Sender portion of the Update Sender/Receiver component. The controlling task receives control periodically and invokes the Update Sender. The Update Sender retrieves the output data from the intercept storage area, prepares the output data for transmission, and forwards the prepared output data to the network transport layer for transmission to the shadow computer system. The Update Sender ensures that the last output data was transmitted to the network by the network transport layer. Thus, the Share System ensures that the intercept storage area is not flushed too quickly so that the data can be optimized before transmission. In step 701, if an acknowledgment has been received for the last output data transmitted, then the Update Sender continues at step 702, else the Update Sender returns. In step 702, if there is output data in the intercept storage area to transmit, then the Update Sender continues at step 703, else the Update Sender returns. In step 703, the Update Sender invokes the Transmit Output Data routine and returns. The Transmit Output Data routine prepares the output data by compressing and encoding the output data before transmitting to the shadow computer system.

Figure 8:
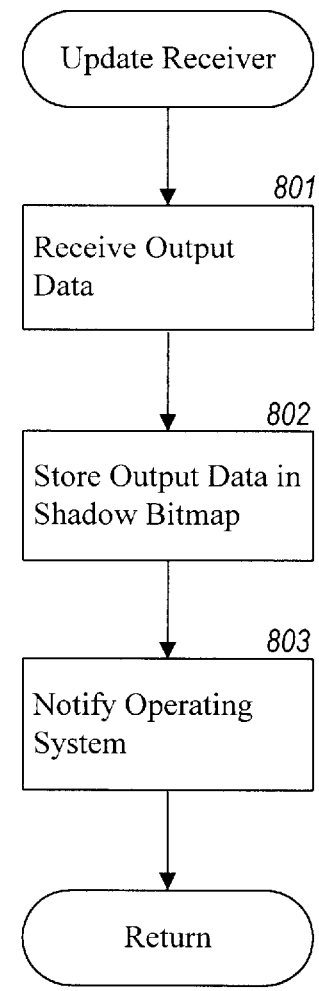
FIG. 8 is a flow diagram of the Update Receiver portion of the Update Sender/Receiver component.

FIG. 8 is a flow diagram of the Update Receiver portion of the Update Sender/Receiver component. The controlling task receives control periodically and the packet router calls the Update Receiver when output data is received. In step 801, the Update Receiver calls the Receive Output Data routine to retrieve the output data received by the network transport task of the shadow computer system. The Receive Output Data routine decodes and decompresses the transmitted output data. In step 802, the Update Receiver stores the output data in the shadow bitmap. In step 803, the Update Receiver notifies the operating system that a portion of the Shadow window is invalid and returns.

Shared Window List Manager (SWLM)

In a preferred embodiment, each computer system can operate as both a host and a shadow computer system. As such, a computer system can display both host windows and shadow windows, which are referred to collectively as shared windows. Since the computer systems function as peers with respect to displaying both host and shadow windows, the computer systems are referred to a "peer1" and "peer2" in the following. The Shared Window List Manager (SWLM) of the Share System ensures that the relative z-order of the shared windows that are displayed on both the peer1 and peer2 computer system are the same. When a change to the relative z-order of the shared windows occurs on one computer system, that computer system notifies the other computer system. The other computer system, upon receiving the notification, adjusts the relative z-order of the shared windows that it displays. The computer systems notify each other by exchanging a list of the shared windows in their relative z-order. This exchanging of lists allows for notification of changes in the z-order that is operating system independent. Thus, if the Share System is implemented on two different operating systems, then applications of a computer system with one operating system can be shared with a computer system with a different operating system. Also, to support this operating system independence, the "orders" and "screen data" are also preferably sent in an operating system independent format.

Figure 9:
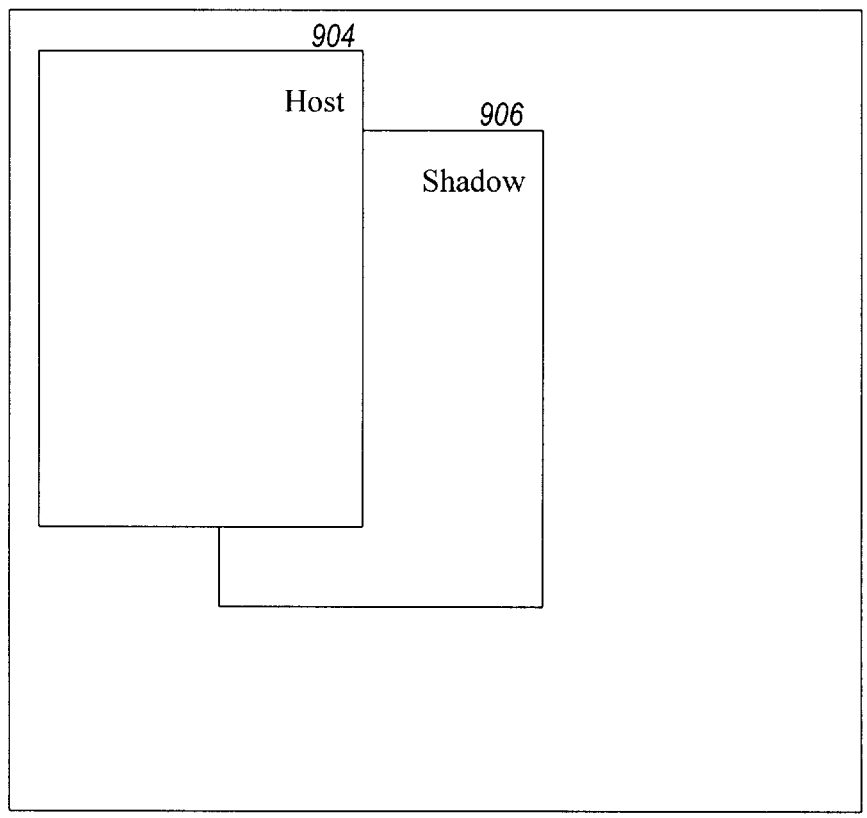
FIGS. 9–11 illustrate an instance in which peer1 would notify peer2 of a z-order change.
Figure 10:
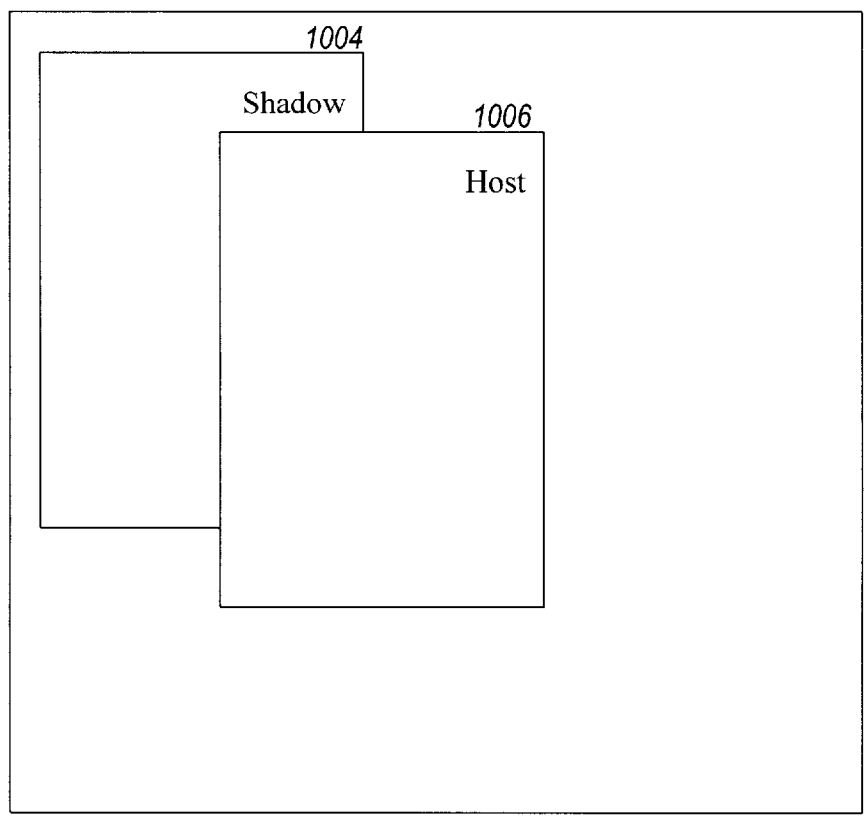
Figure 11:
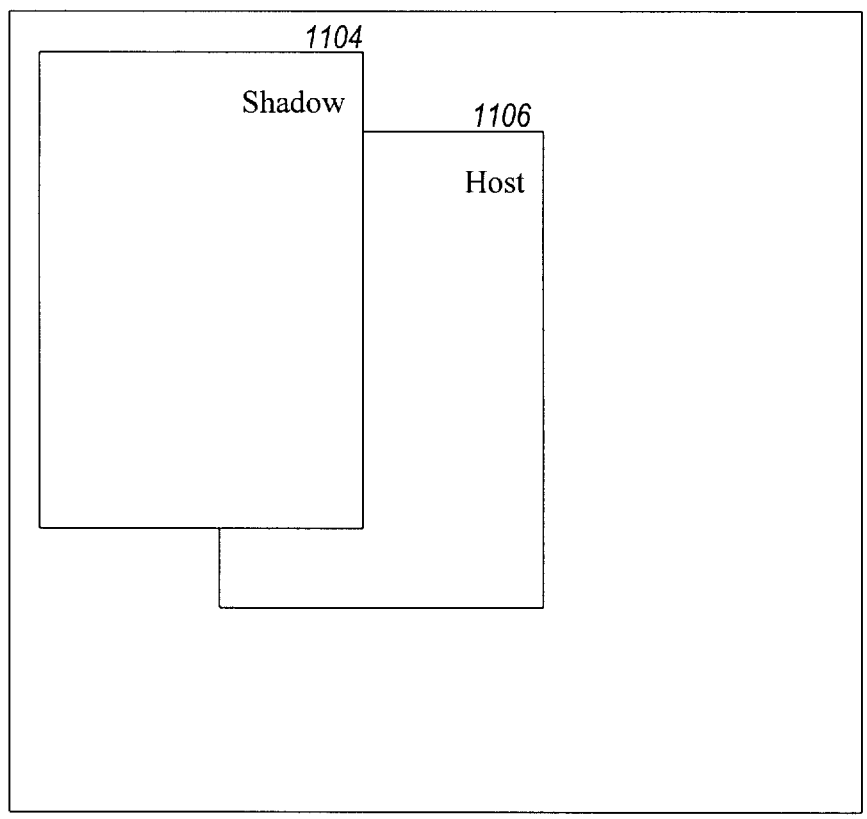

FIGS. 9–11 illustrate an instance in which peer1 would notify peer2 of a z-order change. FIG. 9 illustrates the peer1 computer system with a host window 904, which has the attribute topmost set. The topmost attribute indicates that this window should always be displayed as the topmost window. The peer1 computer system also displays a shadow window 906. FIG. 10 illustrates the peer2 computer system when the peer2 computer system is in control and has activated its host window 1006, making it the topmost window on its display. Then the SWLM at the peer2 computer system notifies the SWLM at the peer1 computer system of the z-order change. The SWLM at the peer1 computer system attempts to bring the shadow window 906 which corresponds to the host window 1006 to the top. However, because the host window 904 has the topmost attribute, the Windows operating system will not bring the shadow window 906 to the top. Then, the SWLM at the peer1 computer system notifies the SWLM at the peer2 computer system of the z-order change. Then, the SWLM at the peer2 computer system updates its z-order to correspond to the z-order at the peer1 computer system. FIG. 11 illustrates the updated z-order at the peer2 computer system.

Figure 12:
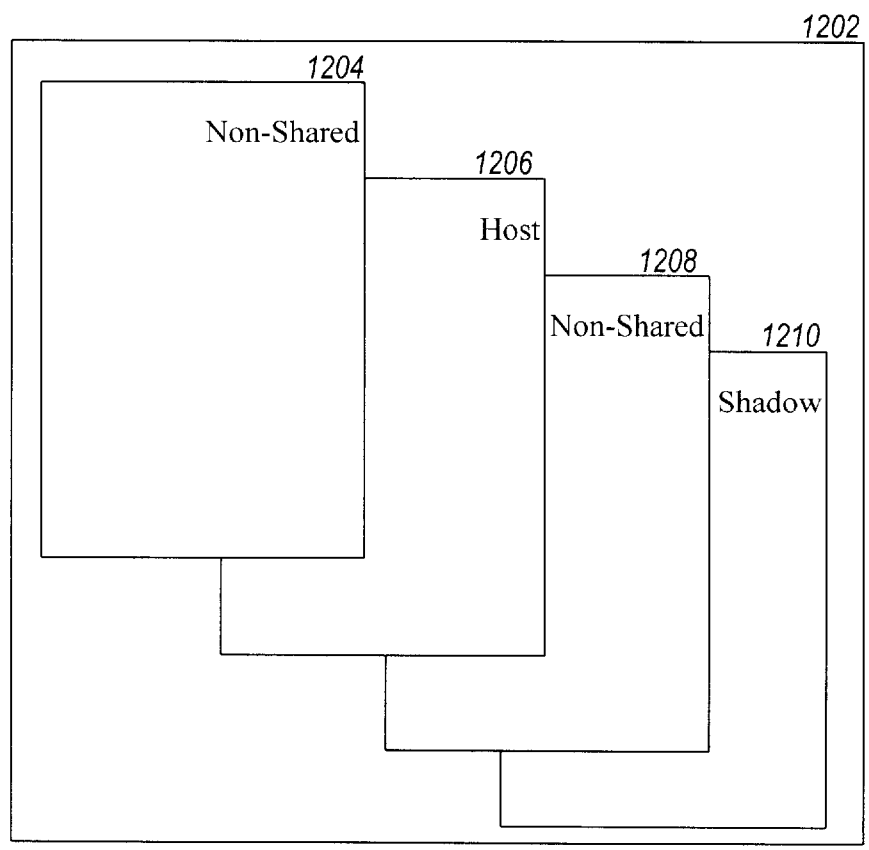
FIGS. 12 and 13 illustrate the desktops of two computer systems that are sharing application programs.
Figure 13:
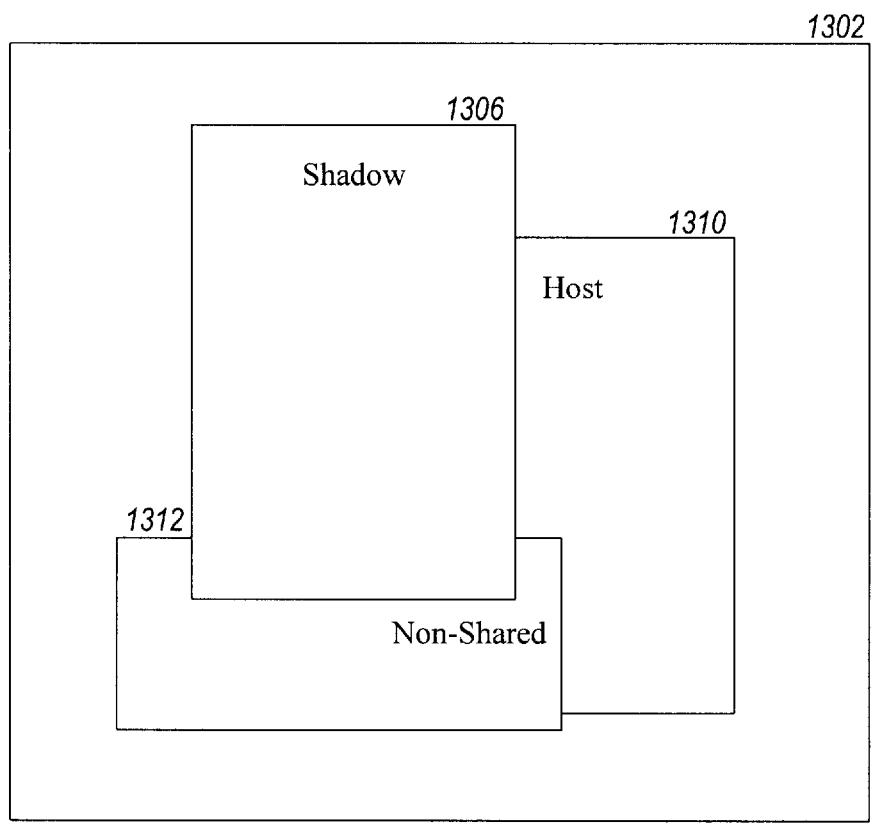

FIGS. 12 and 13 illustrate the desktops of two computer systems that are sharing application programs. FIG. 12 illustrates the desktop of the peer1 computer system. FIG. 13 illustrates the desktop of the peer2 computer system. The desktop 1202 is shown displaying windows 1204, 1206, 1208, and 1210. Windows 1204 and 1208 are windows for non-shared applications that are executing on the peer1 computer system. Window 1206 is a host window for a shared application that is executing on the peer1 computer system. Window 1210 is a shadow window for a shared application that is executing on the peer2 computer system. The z-order of the windows on the peer1 computer system is window 1202, window 1206, window 1208, and window 1210. The desktop 1302 is shown displaying three windows 1306, 1310, and 1312. Window 1306 is a shadow window corresponding to the host window 1206. Window 1310 is a host window corresponding to the shadow window 1210. Window 1312 is a window for a non-shared application that is executing on the peer2 computer system. The z-order of the windows on the peer2 computer system is window 1306, window 1312, and window 1310. The relative z-order of the shared window is the same on both computer systems. That is, the relative z-order of shared windows 1206 and 1210 is the same as the relative z-order of shared windows 1306 and 1310.

Figure 14:
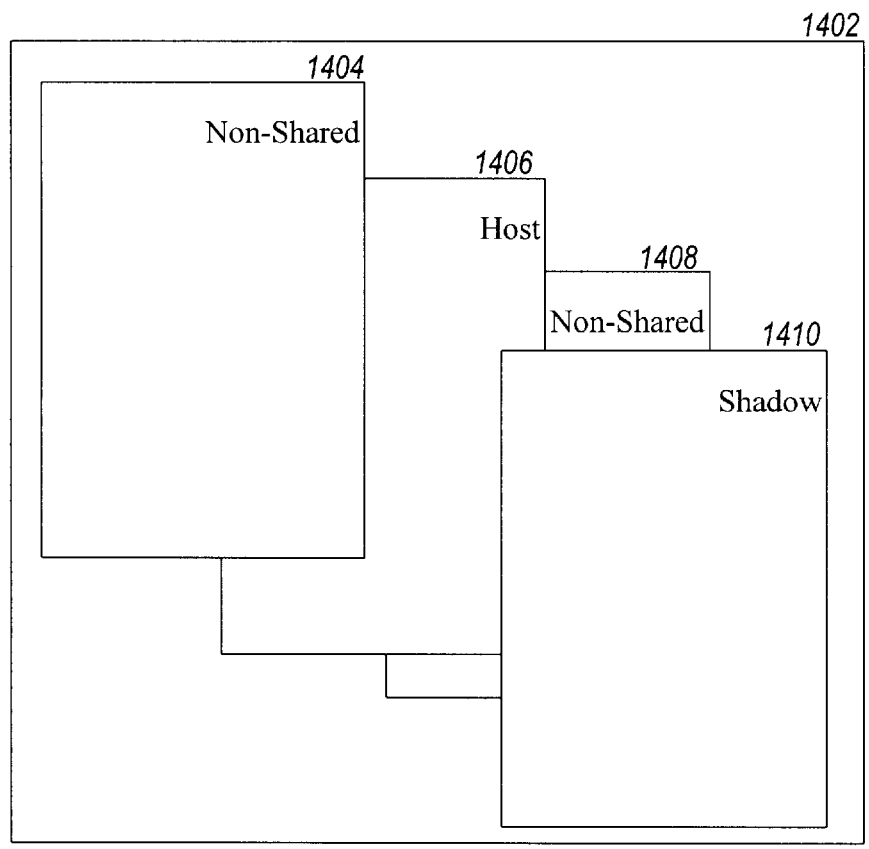
FIGS. 14 and 15 illustrate a change in the relative z-order of the shared windows.
Figure 15:
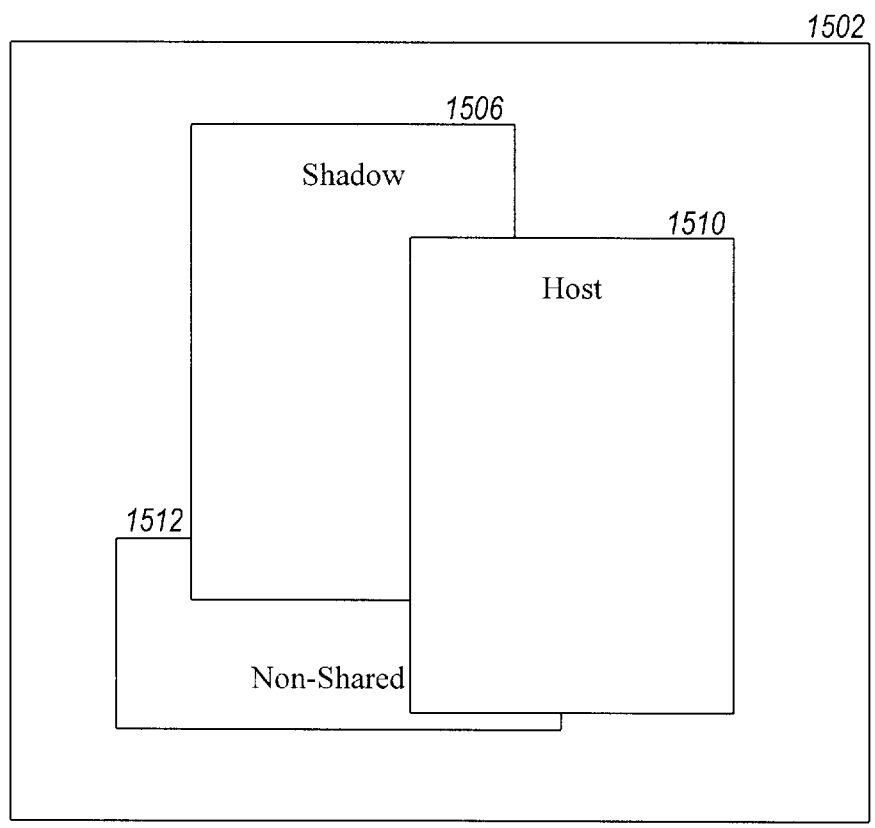

FIGS. 14 and 15 illustrate a change in the relative z-order of the shared windows. If a user of the peer2 computer system selects the host window 1510, then window 1510 will be positioned as the first window in the peer2 computer system as shown in FIG. 15. Upon detecting a change in the relative z-order of shared windows 1506 and 1510, the SWLM of the peer2 computer system notifies the SWLM of the peer1 computer system. The SWLM of the peer1 computer system then changes the z-order of its windows as shown in FIG. 14.

Figure 16:
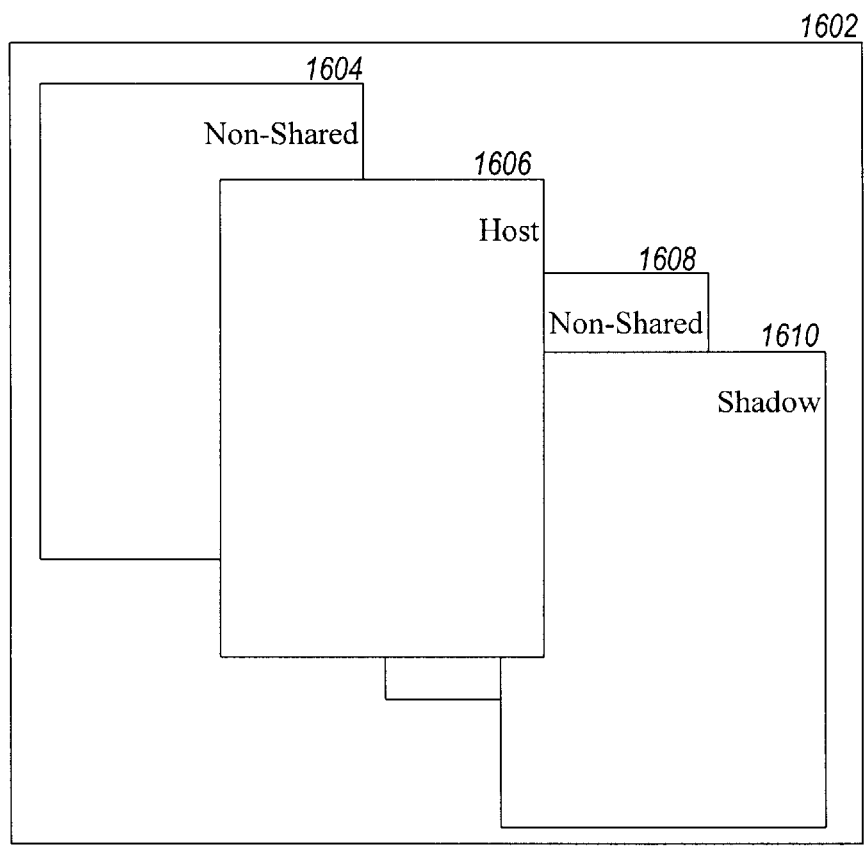
FIGS. 16 and 17 illustrate a further change in the relative z-order of the shared windows.
Figure 17:
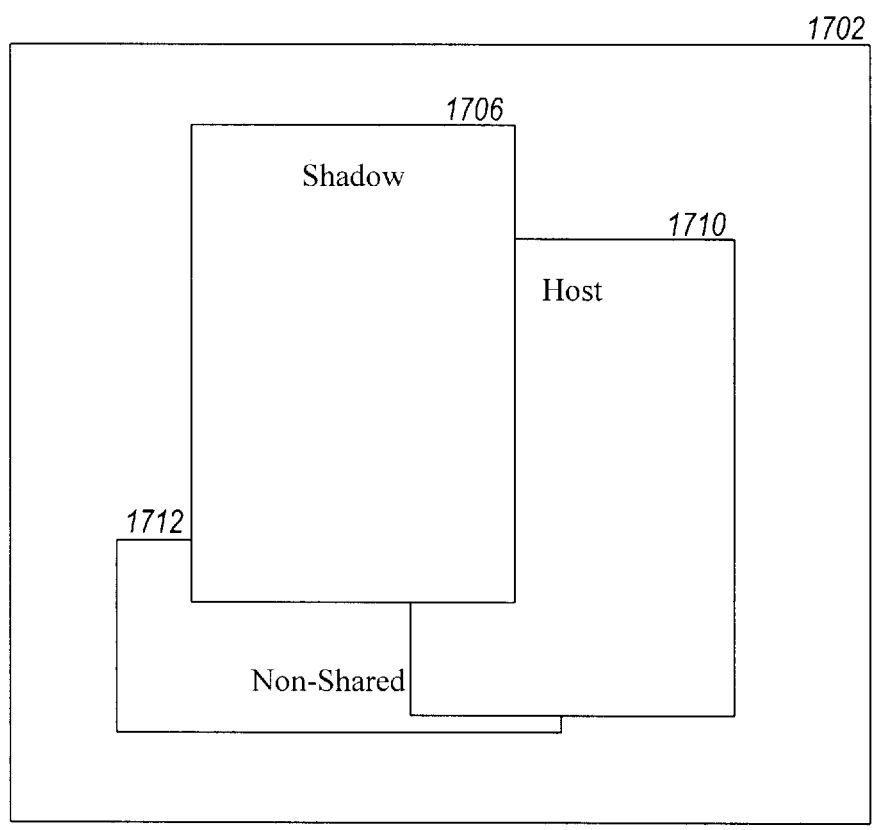

FIGS. 16 and 17 illustrate a further change in the relative z-order of the shared windows. If a user of the peer1 computer system selects the host window 1606, then the window 1606 will be position as the first window in the peer1 computer system as shown in FIG. 16. Upon detecting a change in the relative z-order of the shared windows 1606 and 1610, the SWLM of the peer1 computer system notifies the SWLM of the peer2 computer system. The SWLM of the peer2 computer system then changes the z-order of its windows as shown in FIG. 17.

After changing the z-order of its shared windows, the SWLM of the peer2 computer system will determine whether the z-order of the windows on its desktop is the same as the z-order of the shared windows it received from the SWLM peer1 computer system. The z-orders may be different because the Windows operating system did not accept an update. As discussed earlier with respect to FIGS. 9–11, the Windows operating system may not perform an update to change a z-order when a window has the topmost attribute set. In this case, the SWLM of the peer2 computer system would have to notify the SWLM of the peer1 computer system of its z-order so that the SWLM of the peer1 computer system may update the z-order at the peer1 computer system.

The SWLM maintains a list of information describing the current state of the shared windows. The "shared window list" has an entry for each shared window and the entries are in the relative z-order of the shared windows. In addition, the shared window list contains an entry for each non-shared window which overlaps a shared window. The entries for these shared windows and non-shared windows are interleaved in the same order as they are interleaved on the desktop. For example, if a first window in the interleaved order is a shared window and a second window in the interleaved order is a non-shared window, the first entry is for the shared window and the second entry is for the non-shared window in the shared window list. The SWLM periodically checks with the operating system to determining if the state of its shared windows have changes. When the state has changed, the SWLM updates its "shared window list" and transmits it to its peer computer system. When the SWLM of the peer computer system receives the updated shared window list, it updates its shared window list and its desktop, accordingly. If the transmitted shared window list indicates that a new host window has been created, then the SWLM of the peer computer system creates a corresponding shadow window. The Share System utilizes a "shared window list" in order to provide a method of transferring information between SWLMs at peer computer systems without restricting the method to a particular architecture of a computer system.

Figure 18:
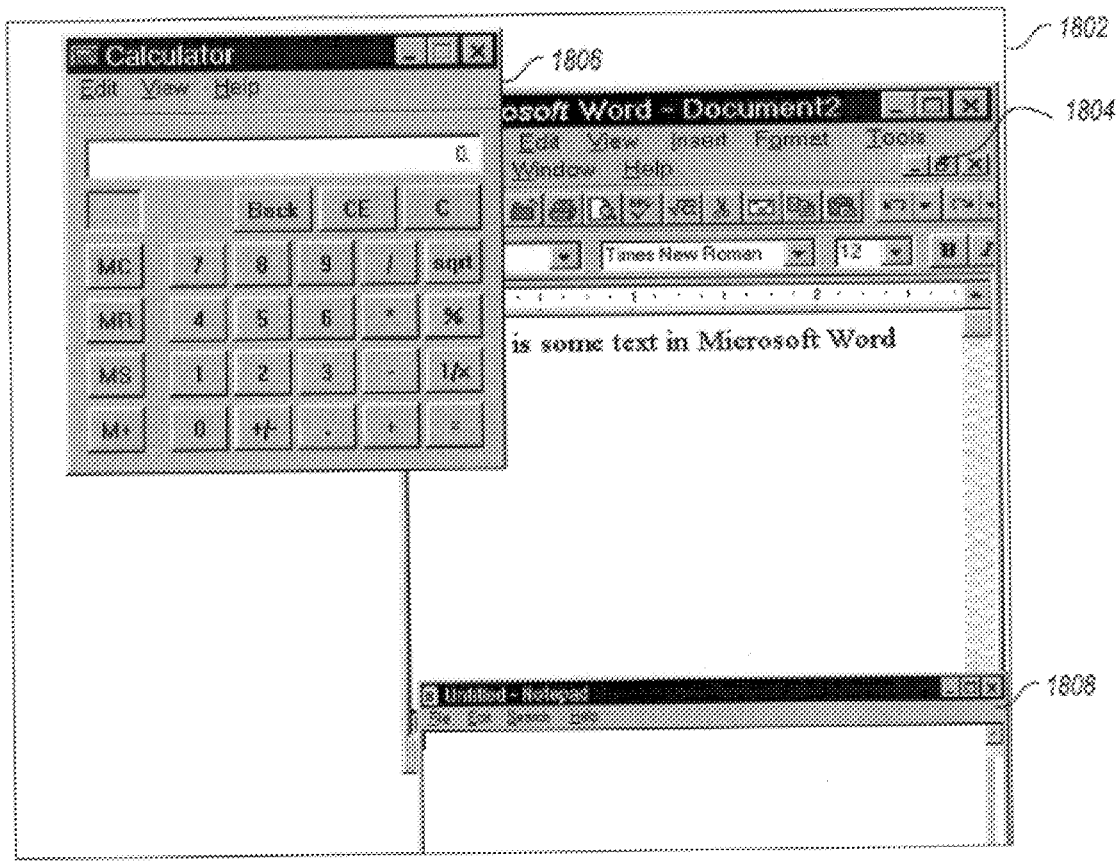
FIG. 18 illustrates a desktop with a partially obscured host window.
Figure 19:
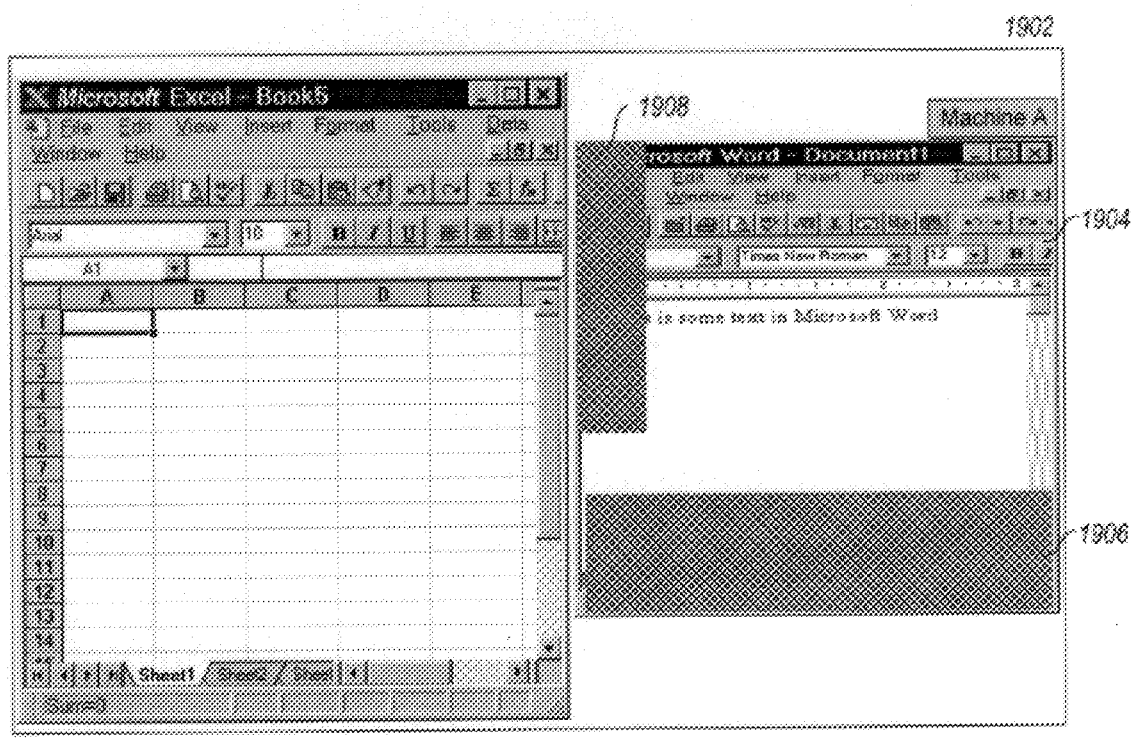
FIG. 19 illustrates a desktop with a shadow window corresponding to a host window that is partially obscured.

The SWLM of a host computer system notifies the SWLM of its shadow computer system when a portion of the host window becomes obscured. FIG. 18 illustrates a desktop with a partially obscured host window. The desktop 1802 contains the host window 1804 and the non-shared windows 1806 and 1808. Each non-shared window 1806 and 1808 partially obscures the host window 1804. When a host window is obscured, either partially or fully, its shared application may continue to "internally" update the host window. For example, if the shared application is a terminal emulation program, it displays the data it receives in its window when its window is not obscured. If, however, its window is fully obscured when it receives data, then the terminal emulation program can only "internally" updates its window. When the window then becomes unobscured, the terminal emulation application paints its internally maintained window to the display. Since the operating system is not notified of such internal updates to a window, the Share System cannot intercept these internal updates.

Because these internal updates cannot be intercepted, the shadow window may not accurately reflect the internal state of a window that is partially obscured. Consequently, the SWLM of a host computer system notifies its shadow computer system of which portions of the host window are obscured. Upon receiving the notification, the SWLM of the shadow computer system cross hatches corresponding obscured portions of the shadow window. The desktop 1902 contains shadow window 1904 and non-shared window 1910. The shadow window 1904 corresponds to host window 1804. The cross hatched portions 1906 and 1908 correspond to the portions of the host window 1804 that are obscured by non-shared windows 1808 and 1806, respectively. The area of a host window that is obscured is referred to as an obscured window region.

Figure 20:
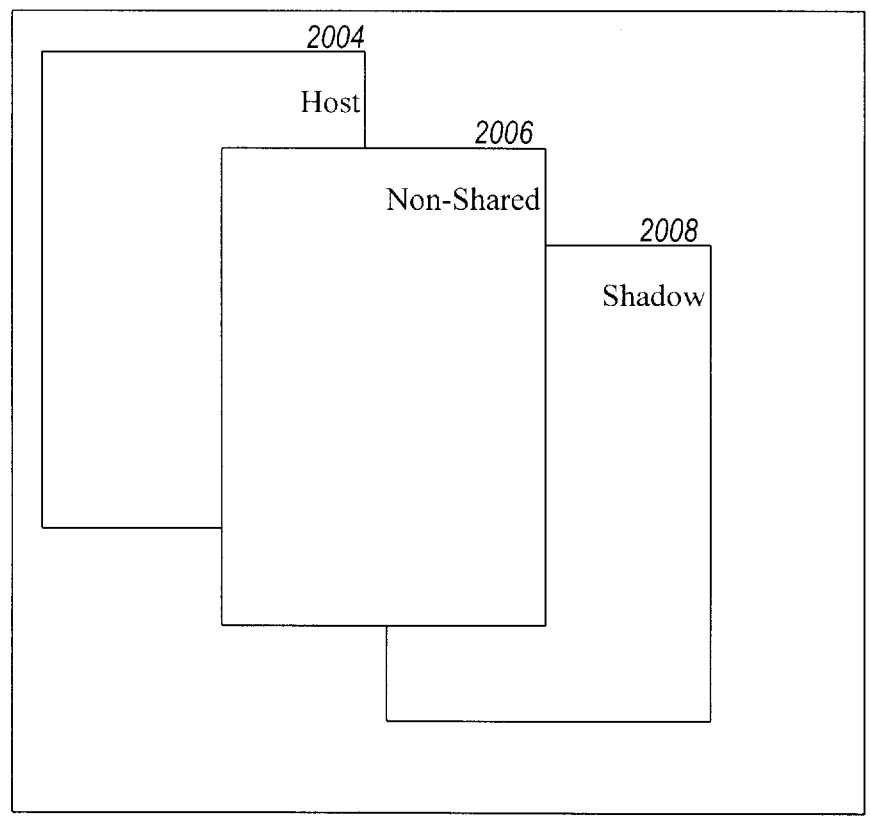
FIG. 20 illustrates the initial state of the peer1 computer system.
Figure 21:
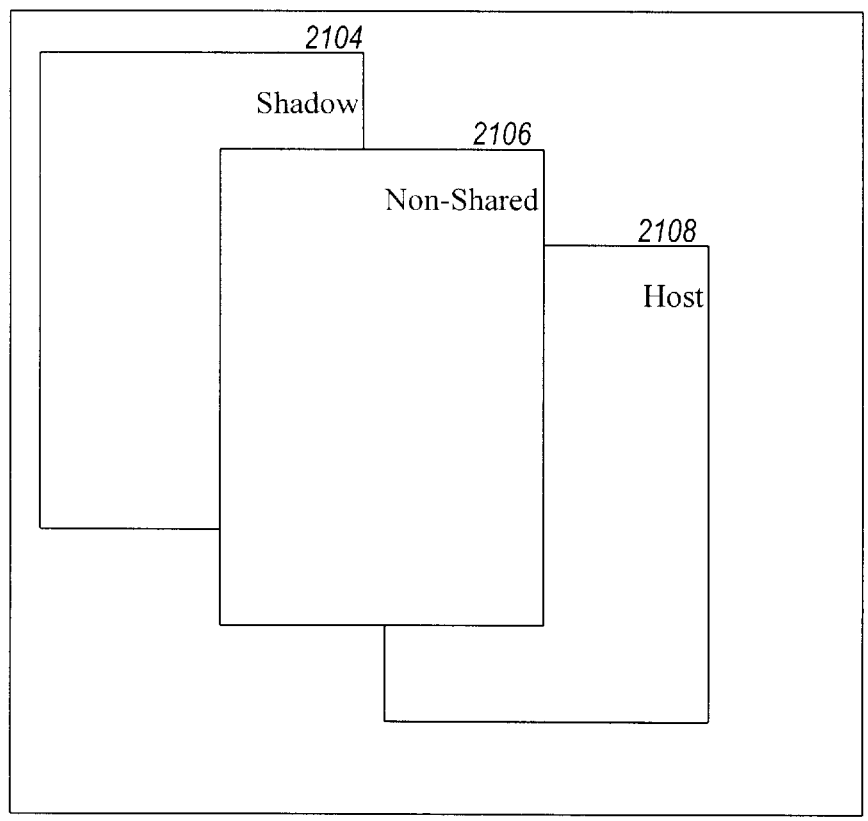
FIG. 21 illustrates the initial state of the peer2 computer system.
Figure 22:
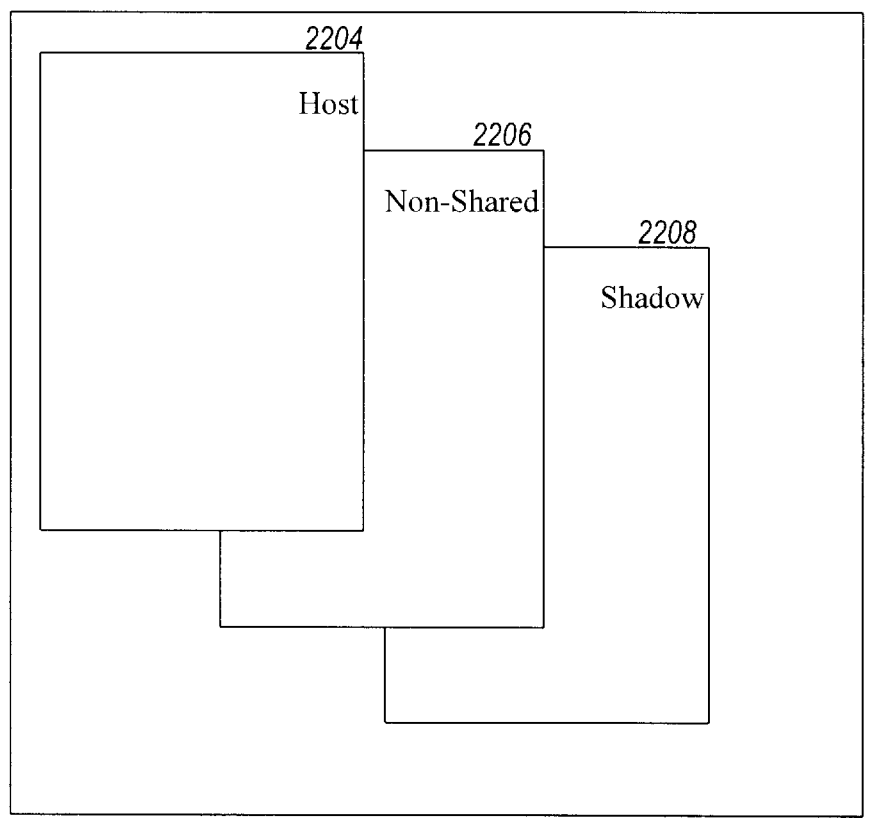
FIGS. 22 and 23 illustrates the peer1 and peer2 computer systems, respectively, after each has activated a host window.
Figure 23:
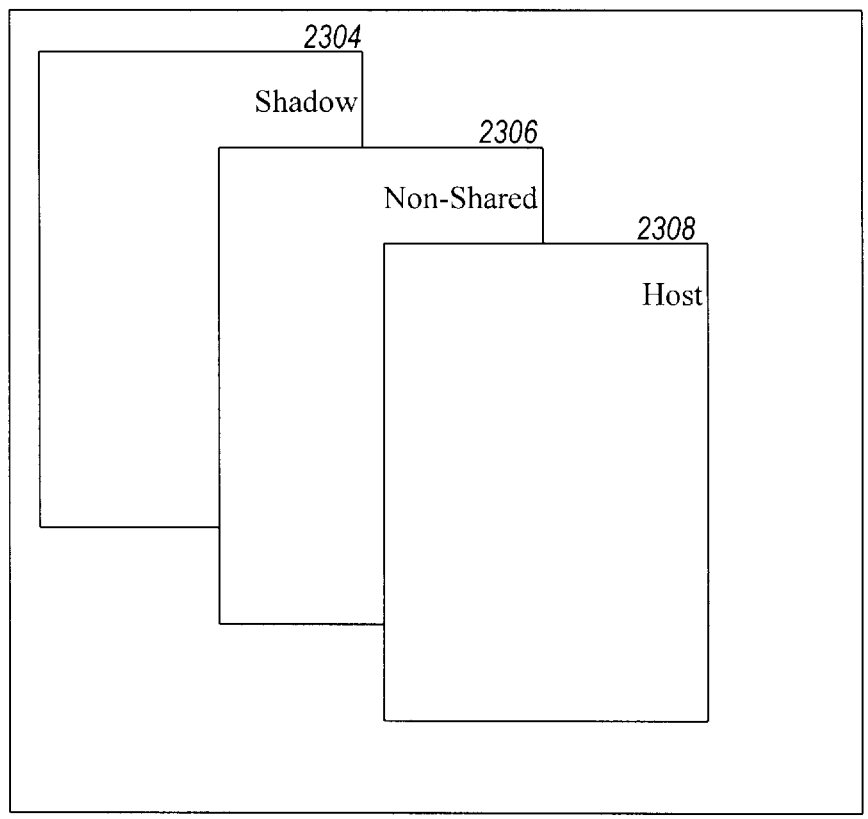

The SWLMs of two peer computer systems may send each other shared window lists in close proximity. If both were to update their desktops at the same time based on differed shared window lists, their desktops would not correspond. FIGS. 20–23 illustrate this problem. FIG. 20 illustrates the initial state of the peer1 computer system. The peer1 computer system has a non-shared window 2006 as the topmost window. FIG. 21 illustrates the initial state of the peer2 computer system. The peer2 computer system has a nonshared window 2106 as its topmost window. If the peer1 and peer2 computer systems were to both activate their host windows at the same time, the two computer systems would have different z-orders for shared windows. FIGS. 22 and 23 illustrates the peer1 and peer2 computer systems, respectively, after each has activated a host window. FIG. 22 illustrates that a host window 2204 is the topmost window. FIG. 23 illustrates that a host window 2304 is the topmost window. Then, each computer system's SWLM would notify the other computer system's SWLM that it should updates its z-order. If both peer computer systems updated their z-order with these differed shared window lists, then the z-orders of the shared windows would not correspond.

The Share System provides a protocol for avoiding this problem using a token placed in the shared window list. Each SWLM maintains a base number that is either the sequence number which the SWLM most recently sent with a shared window list or the sequence number of a shadow window list which it received and applied, whichever is the more recent. When a SWLM of a peer1 computer system is sending a shared window list to a SWLM of a peer2 computer system, the SWLM of the peer1 generates a token which is to be included in the shared window list. The token includes a sequence number and a tick. The sequence number is generated by adding an increment to the base number. The increment is based on the type of action which is to be performed by the SWLM of peer2. For example, a z-order change has the largest increment and is the highest priority. A tick indicates the time at which a token was generated.

Upon receiving a shared window list, the SWLM of peer2 determines whether or not to apply the changes indicated by the received shared window list. First, the SWLM of peer2 generates a test sequence number using its current base and an increment based on the changes indicated by the shared window list. If the received sequence number and the test sequence number are the same, then the SWLM of peer2 applies the indicated changes. If the received sequence number and the test sequence number are not the same, then the SWLM of peer2 will compare its current base with the received sequence number. If its base is smaller than the received sequence number, then this indicates that the SWLM of peer2 applies the changes indicated by the shared window list and resends its shared window list to peer1. If its base is larger than the received sequence number, then the SWLM of peer2 discards the received shared window list and enters a synchronize mode. During a synchronize mode, the SWLM of peer2 waits for an updated shadow window list from the SWLM of peer1. Upon received the updated shadow window list, the SWLM of peer2 repaints all shared windows. If the base number and the received sequence number are the same, then the tick is used to determine whether or not to apply changes, in the same manner the base number is used.

Figure 24:
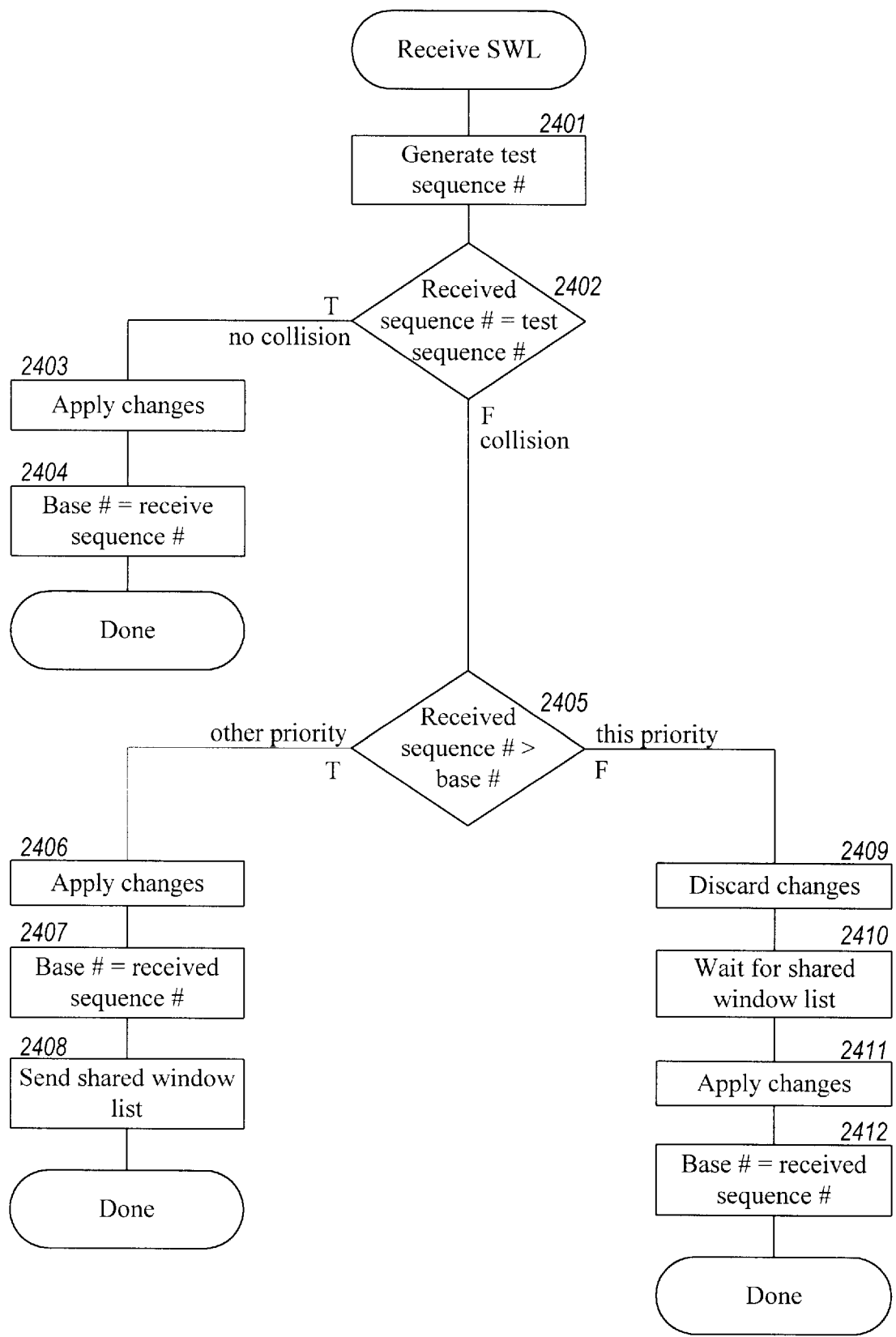
FIG. 24 is a flow diagram of the Receive SWL routine.

FIG. 24 is a flow diagram of the Receive SWL routine. The Receive SWL routine handles the processing for a shared window list. In step 2401, the Receive SWL routine generates the test sequence number. The test sequence number is its base sequence number plus the increment that was applied to generate the receive sequence number. In step 2402, if the receive sequence number equals the test sequence number, then no collision in sending a shared window list has occurred and the routine continues at step 2403, else a collision has occurred and the routine continues at step 2405. In step 2403, the Receive SWL routine applies the changes indicated in the shared window list. In step 2404, the Receive SWL routine sets its base number to the receive sequence number and completes its processing. In step 2405, if the receive sequence number is greater than the base number, or if the receive sequence number is equal to the base number and the received tic number is greater than the tic number in the last shared window list sent, then the received shared window lists has highest priority and the routine continues at step 2406, else the last transmitted shared window list has highest priority and the routine continues at step 2409. In step 2406, the Receive SWL routine applies the changes indicated in the receive shared window list. In step 2407, the Receive SWL routine sets its space number equal to the receive sequence number. In step 2408, the Receive SWL routine sends its shared window list to the other computer system and the routine completes. In step 2409, the Receive SWL routine discards the receive shared window list without applying the changes. In step 2410, the Receive SWL routine enters a sequenization mode and waits for the shared window list to be resent. In step 2411, the Receive SWL routine applies the changes in the resent shared window list. In step 2412, the Receive SWL routine sets its base number to the receive sequence number and completes.

Figure 25A:
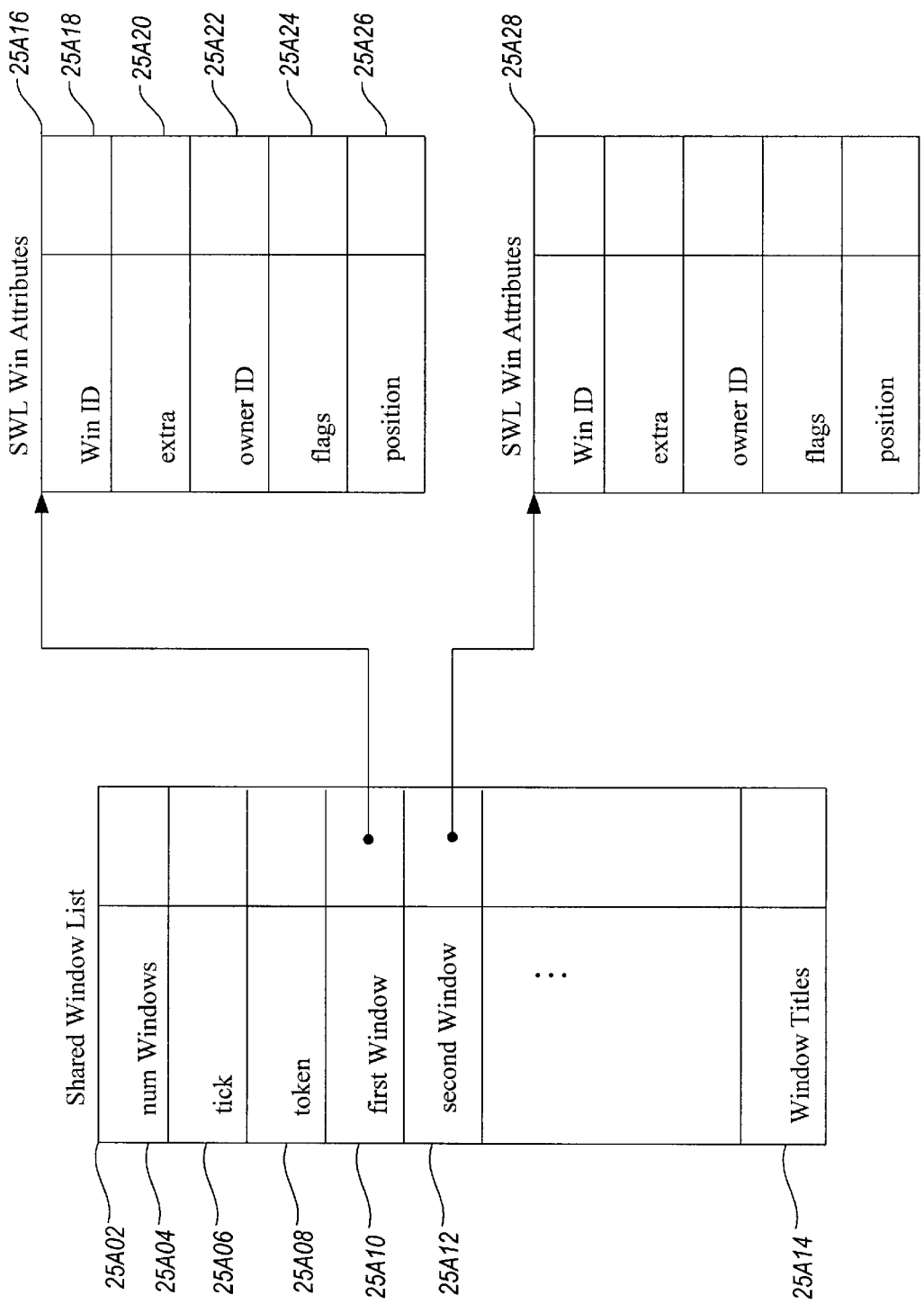
FIG. 25A illustrates the shared window list.

FIG. 25A illustrates the shared window list. A shared window list 25A02 contains several entries. The numWindows entry indicates the number of windows which are shared. The tick entry 25A06 indicates the time at which this shared window list was generated. The token entry 25A08 is used by the receiving SWLM to determine whether to update its desktop based on the shared window list. The firstWindow entry 25A10 contains a pointer to the SWLWINATTRIBUTES list 25A16, which describes the first window in the shared window list. The secondWindow entry 25A12 contains a pointer to the SWLWINATTRIBUTES list 25A28, which describes the second window in the shared window list. The ellipses in the shared window list indicate entries for other windows. The numWindows entry 25A04 indicates the number of windows in the shared window list. The shared window list includes an entry for each shared window as well as for each window which obscures part of a shared window. The WindowTitle sentry 25A14 contains the titles of the windows that have titles.

The SWLWINATTRIBUTES lists contain information about the windows. The WinID field 25A18 indicates the handle to the window. The extra field 25A20 contains information about the window, such as the application identifier of the application which owns the window. The ownerID field 25A22 indicates the identifier of the owner of the window. The ownerID field is valid only for host windows. The flags field 25A24 contains several flags that describe the window, such as whether it is a host or a shadow window. One flag indicates that the window has been maximized. Another flag indicates that the window is a host window. Another flag indicates that the window is a shadow window. Another flag indicates that the window is a non-shared window.

The extra entry provides different information based on the flags that are set. For example, when a flag indicates that the window is a host window, the extra entry contains the application identifier of the application which owns the window. Also, when a flag indicates that the window is a shadow window, the extra entry contains an identifier of the host computer system. The position entry 25A26 contains the bounds of the rectangle of the window in virtual desktop coordinates giving the coordinate indicating the top left and bottom right corners of the rectangle.

Figure 25B:
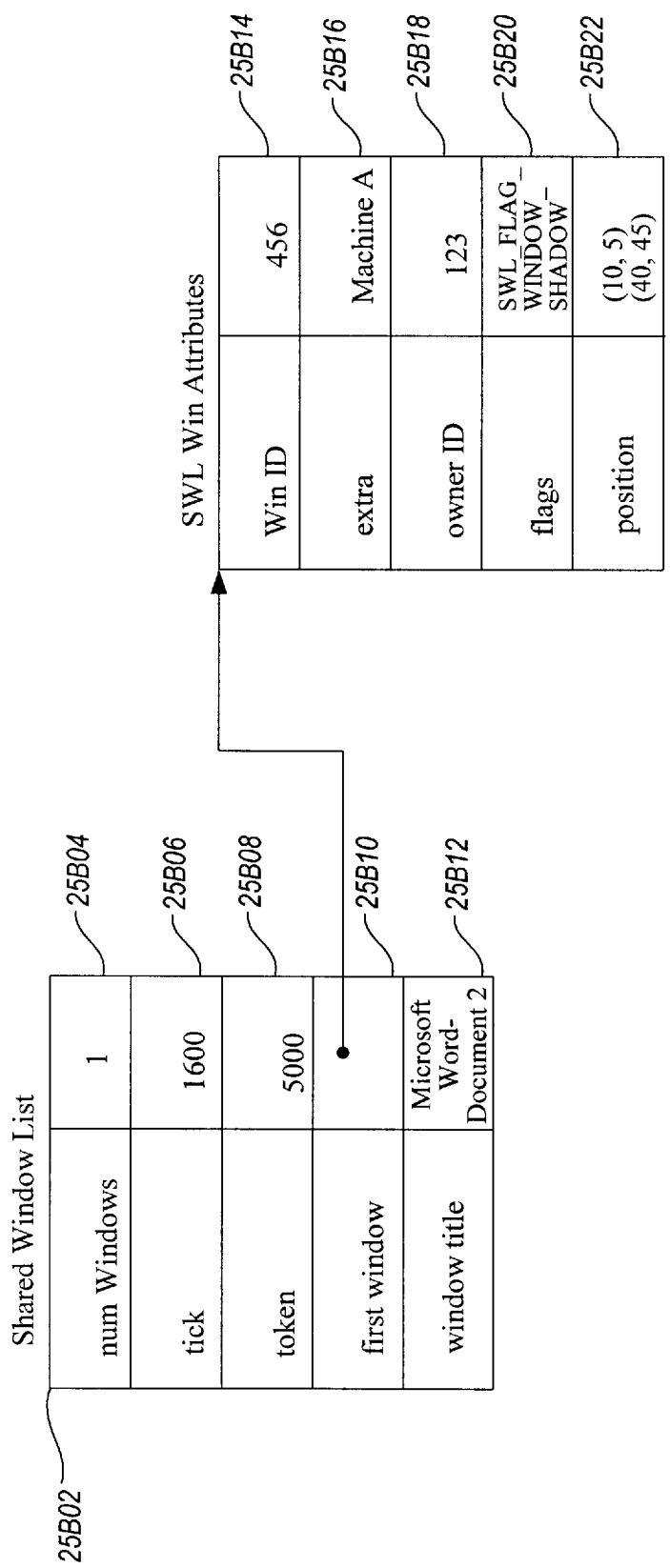
FIG. 25B illustrates a shared window list after creation of a host window.

FIG. 25B illustrates a shared window list after creation of a host window. The shared window list 25B02 contains one window as indicated by the numWindows entry 25B04. The tick entry 25B06 indicates that this structure was generated at 1600 milliseconds. The token entry 25B08 indicates the sequence number 5000. The first window entry 25B10 points to a SWLWINATTRIBUTES structure 25B13. The SWLWINATTRIBUTES structure has a WinID field 25B14, which indicates that the windowID is 456. The extra field 25B16 indicates that host computer system is MachineA. The ownerID field 25B18 indicates that the identifier of the owner is 123. The flags field 25B20 indicates the window is a host window. The position field 25B22 indicates that the coordinates indicating the boundary of the shared window on the virtual desktop are (10, 5) and (40, 45). The window title entry 25B12 contains "Microsoft Word-Document2."

Figure 26:
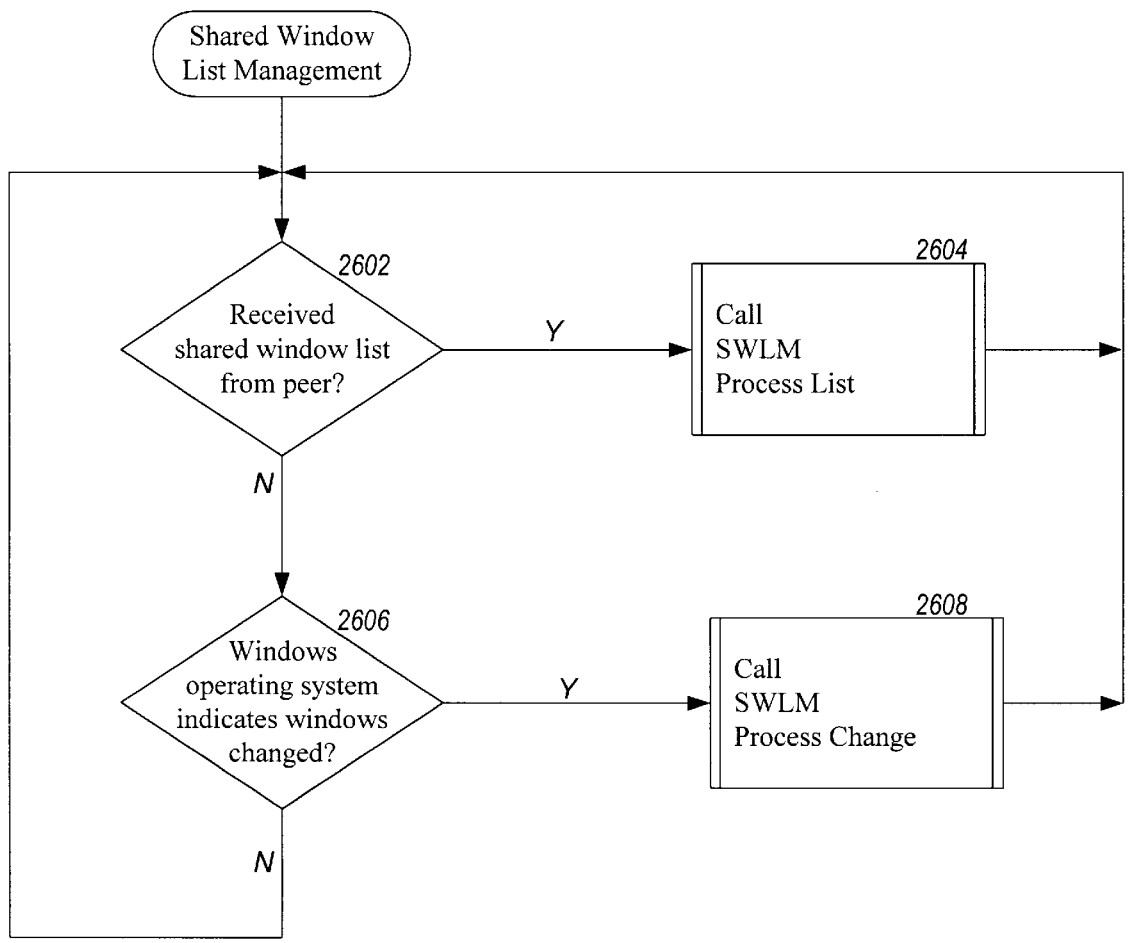
FIG. 26 illustrates an overview flow diagram of the SWLM.

FIG. 26 illustrates an overview flow diagram of the SWLM. The SWLM determines whether there have been changes on its desktop by comparing its shared window list with information obtained from the operating system. When there have been changes, the SWLM informs its peer SWLM of the changes. The peer SWLM may then update its own desktop. In addition, when the SWLM receives a shared window list from its peer SWLM, the SWLM updates its own desktop accordingly. In step 2602, if the SWLM received a shared window list from its peer SWLM, then the SWLM continues at step 2604, otherwise the SWLM continues at step 2606. In step 2604, the SWLM calls the SWLM Process List routine. In step 2606, if the SWLM determines that state have the window have changed, then the SWLM continues at step 2608, otherwise the SWLM loops back to step 2602. In step 2608, the SWLM routine calls the SWLM Process Change routine.

Figure 27:
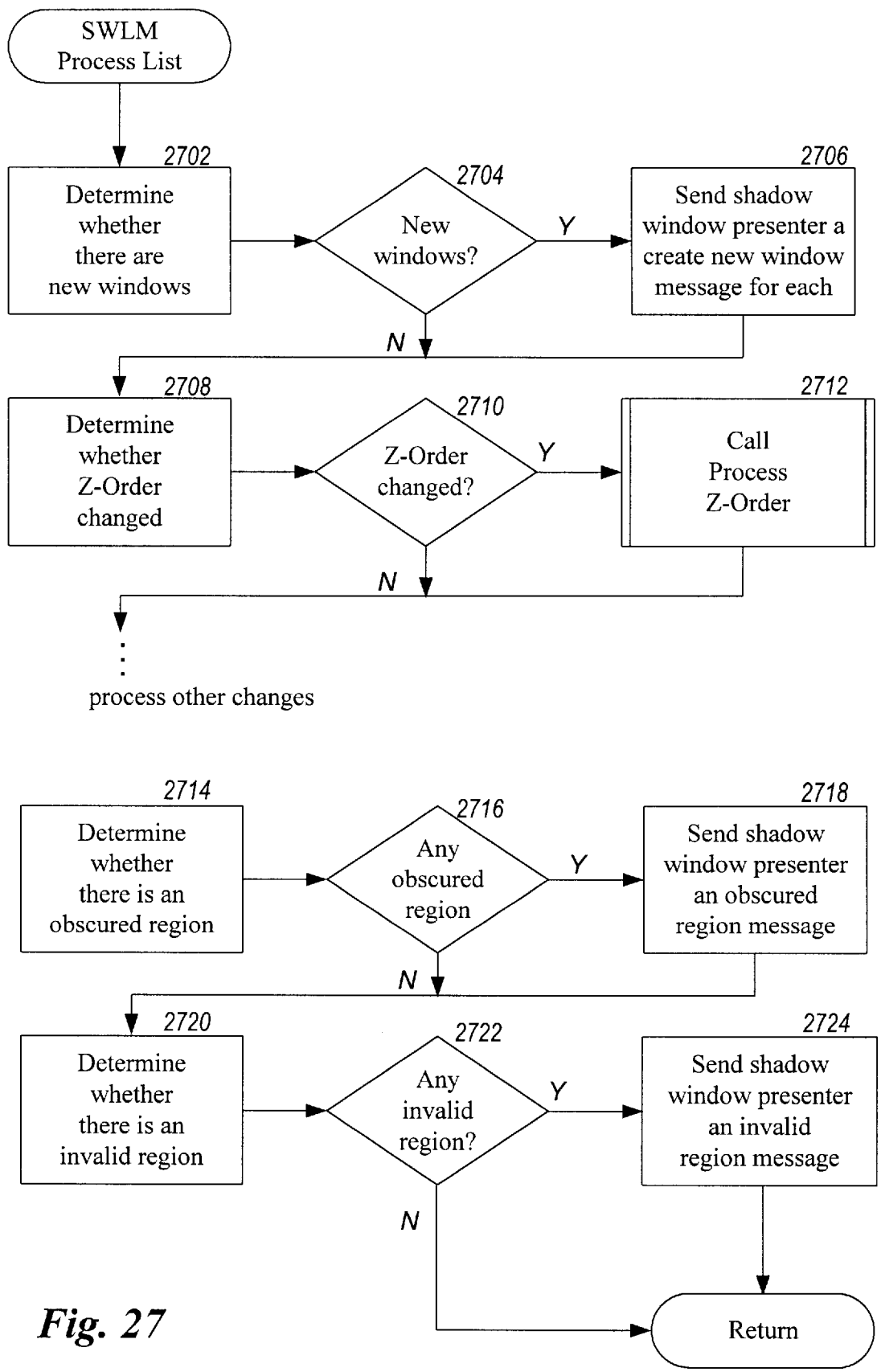
FIG. 27 illustrates a flow diagram of the SWLM Process List routine.

FIG. 27 illustrates a flow diagram of the SWLM Process List routine. The SWLM Process List routine updates its desktop based on a received shared window list. The routine determines what changes have been made by comparing the received shared window list with its own shared window list. For example, if the received shared window list contains a host window which is not in the its own shared window list, then the routine generates a new shadow window to correspond to the new host window. In step 2702, the SWLM Process List routine determines whether there are new windows in the received shared window list. In step 2704, if there are new windows, then the routine continues at step 2706, otherwise the routine continues at step 2708. In step 2706, the SWLM Process List routine calls the SWP to create each new window on its own local desktop. In step 2708, the SWLM Process List routine determines whether the received shared window list indicates a change in the relative z-order of the shared windows. In step 2710, if the z-order has changed, then the routine continues at step 2712, otherwise the routine continues to process other changes. In step 2712, the SWLM Process List routine calls the Process Z-Order routine to change the z-order of windows on its desktop. In step 2714, after processing other changes, the SWLM Process List routine uses the received shared window list to determine the obscured regions. In step 2716, if there is an obscured region, then the routine continues at step 2718, otherwise the routine continues at step 2720. In step 2718, the SWLM Process list routine notifies the SWP of the obscured region. In step 2720, the SWLM Process List routine determines whether there is an invalid shadow window region. As discussed below, an invalid shadow window region is an area for which the shadow computer has not yet received the output data from the host computer system. In step 2722, if there is an invalid region, then routine continues at step 2724, otherwise the routine returns. In step 2724, the routine sends the SWP an invalid shadow window region and returns.

Figure 28:
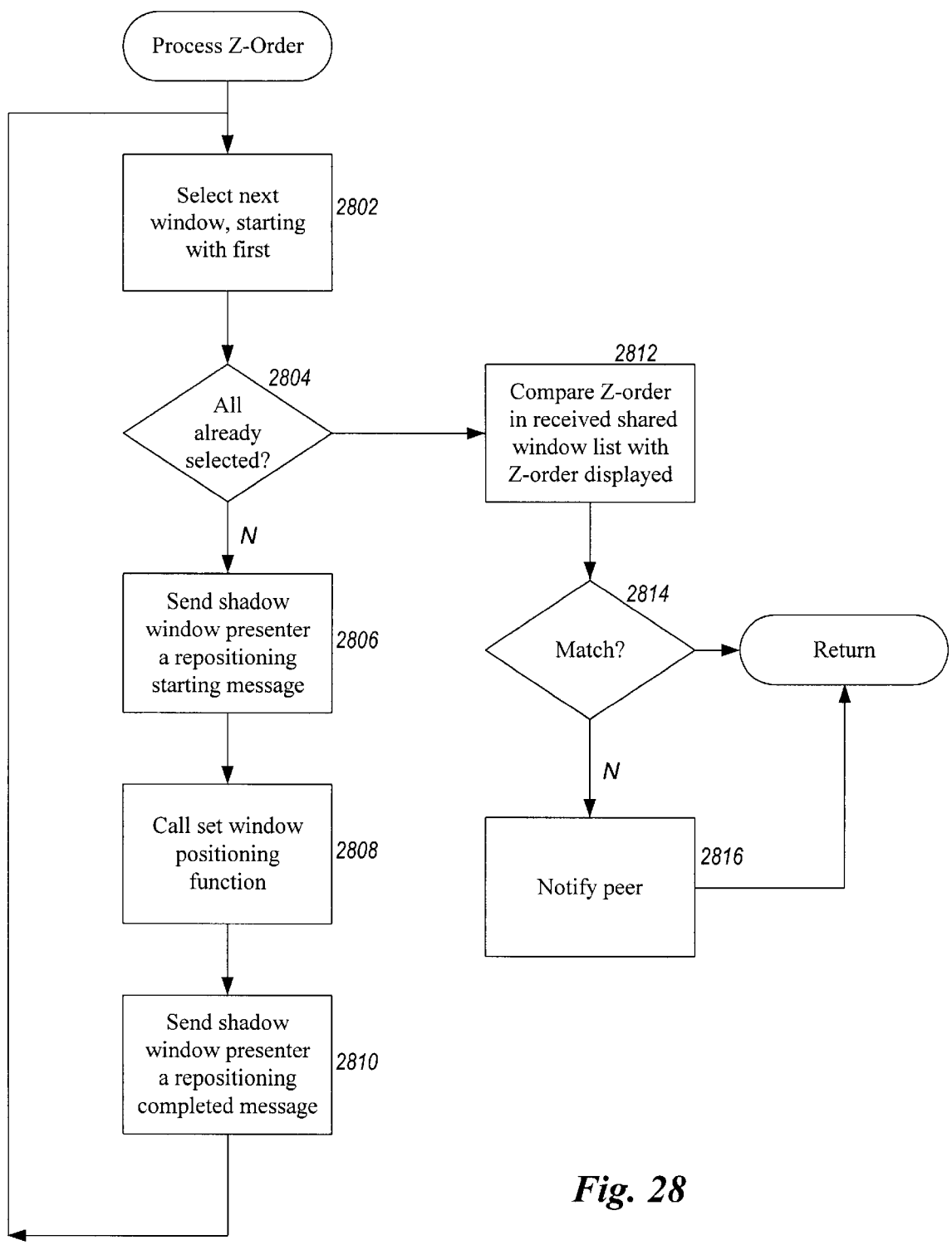
FIG. 28 illustrates a flow diagram of the Process Z-Order routine.

FIG. 28 illustrates a flow diagram of the Process Z-Order routine. The Process Z-Order routine obtains a handle to each window on its desktop from the operating system. Then, the Process Z-Order routine reorders the windows correspond to the z-order in the received shared window list. In step 2802, the Process Z-Order routine selects the next window, starting with the first. In step 2804, if all windows have already been selected, the routine continues at step 2812, otherwise the routine continues at step 2806. In step 2806, the routine sends to the shadow window presenter ("SWP") routine a repositioning starting message (SWP_BeginShadowWindowMove, described below). In step 2808, the Process Z-Order routine calls the a set window position function operating system. In step 2810, the Process Z-Order routine sends the SWP window presenter a repositioning completed message. In step 2812, the Process Z-Order routine compares the z-order in the received shared window list with the z-order of its own desktop. In 2814, if the z-orders match, then the routine returns, otherwise the routine continues at step 2816. In step 2816, the Process Z-Order routine notifies the peer SWLM that the z-orders do not match and so the peer SWLM manger should update the remote desktop.

Figure 29:
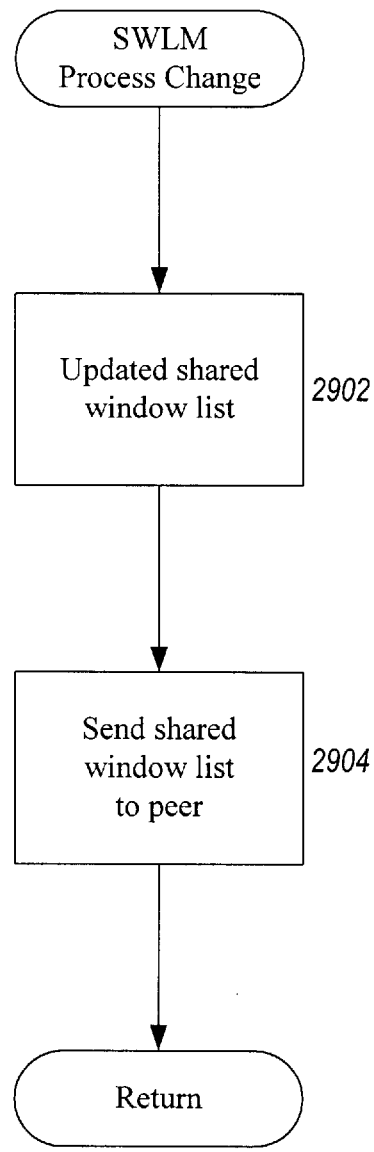
FIG. 29 illustrates a flow diagram of the SWLM Process Change routine.

FIG. 29 illustrates a flow diagram of the SWLM Process Change routine. The SWLM Process Change routine is called after it is determined that the state of the windows on its desktop have changed. The SWLM Process Change routine notifies the peer SWLM of the changes. In step 2902, the SWLM Process Change routine updates its shared window list. In step 2904, the SWLM Process Change routine sends the updated shared window list to the peer SWLM.

The SWLM uses the SetWindowPos function of the Windows operating system to order each window appropriately. When the SetWindowPos function is called, the Windows operating system sends the window a WM_WINDOWPOSCHANGE message. The shadow window presenter component discards all WM_WINDOWPOSCHANGE messages indicating a position change unless they are preceded by a SWP_BeginShadow WindowMove message. In particular, the SWLM notifies the SWP that it is repositioning the shared windows by sending the SWP a SWP_BeginShadowWindowMove message before calling the SetWindowPos function. Following the call to the SetWindowPos function, the SWLM informs the SWP that it has completed repositioning a window by sending the SWP a SWP_EndShadowWindowMove message. The window procedures for the shadow windows (part of the SWP) only respond to window movement messages that are bracketed by the SWP messages. This ensures that a user of a shadow window cannot reposition the shadow window. Shared windows are preferably only repositioned by a user of the host computer system.

Desktop Scroller

The Share System provides a technique for accommodating differences in desktop resolution (i.e., display device resolution in pixels) between computer systems. In particular, when one computer system has a lower resolution desktop than the other computer system, the Share System of the computer system with the lower resolution desktop provides desktop scrolling. Desktop scrolling simulates the higher resolution desktop by generating a virtual desktop with the same resolution as the higher resolution desktop. For example, if the higher resolution is 1024 by 768 pixels and the lower resolution is 640 by 480 pixels, then Share System of the computer system with the 640 by 480 pixel resolution desktop simulates a 1024 by 768 pixel virtual desktop. However, only a 640 by 480 pixel area of the virtual desktop can be displayed at one time on the computer system with the lower resolution desktop. Consequently, the Share System of the computer system with the lower resolution desktop simulates a 640 by 480 pixel viewport into the virtual desktop. The Share System automatically scrolls the viewport as the user of the computer system with the lower resolution desktop moves the cursor (i.e., mouse pointer or insertion point) towards an edge of the viewport (i.e., the display). In this way, a user of the computer system with the lower resolution desktop can view the entire higher resolution desktop, albeit only a portion at a time. By using desktop scrolling, the Share System avoids having to scale the output data to accommodate the different resolutions.

Figure 30:
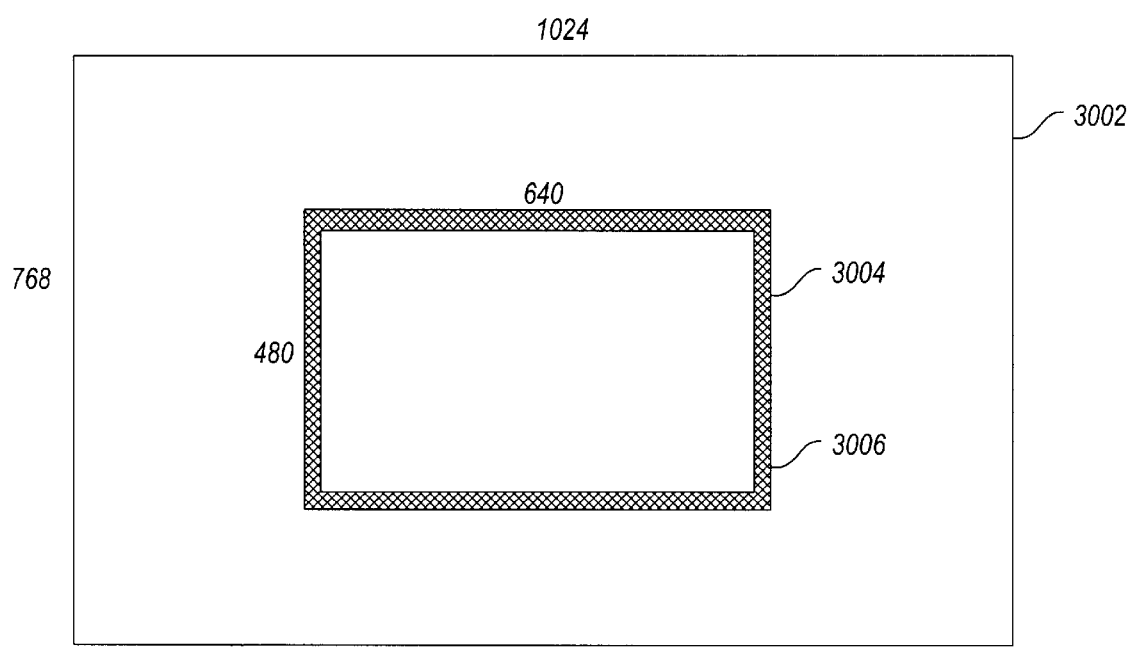
FIG. 30 illustrates a viewport into the virtual desktop.

FIG. 30 illustrates a viewport into the virtual desktop. The virtual desktop 3002 is 1024 by 768 pixels, which is the size of the larger resolution desktop. The viewport 3004 is 640 by 480 pixels, which is the size of the smaller resolution desktop. The smaller resolution display becomes a viewport into the virtual desktop. Scrolling occurs when the cursor enters a scroll region 3006, which is at the edge of the physical display of the computer system with the lower resolution desktop.

The Desktop Scroller of the Share System controls desktop scrolling. The Desktop Scroller (of the computer system with the lower resolution desktop) captures all mouse and keyboard events by installing a hook into the operating system. When the hook receives a mouse or a keyboard event, it invokes the Desktop Scroller. When the mouse or keyboard event indicates that the cursor is within a scroll region of the desktop, the Desktop Scroller retrieves a list of the current windows from the operating system and requests that the operating system change the origin of each window to simulate the scrolling.

Figure 31:
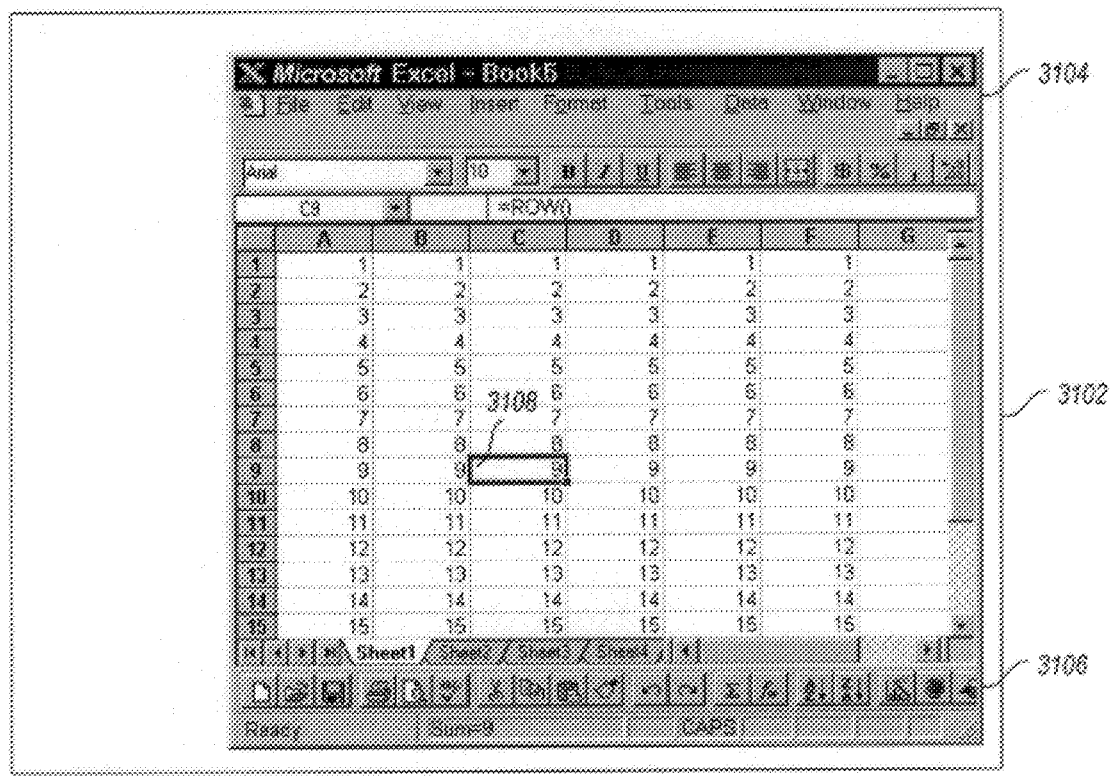
FIG. 31 and FIG. 32 illustrate desktop scrolling.
Figure 32:
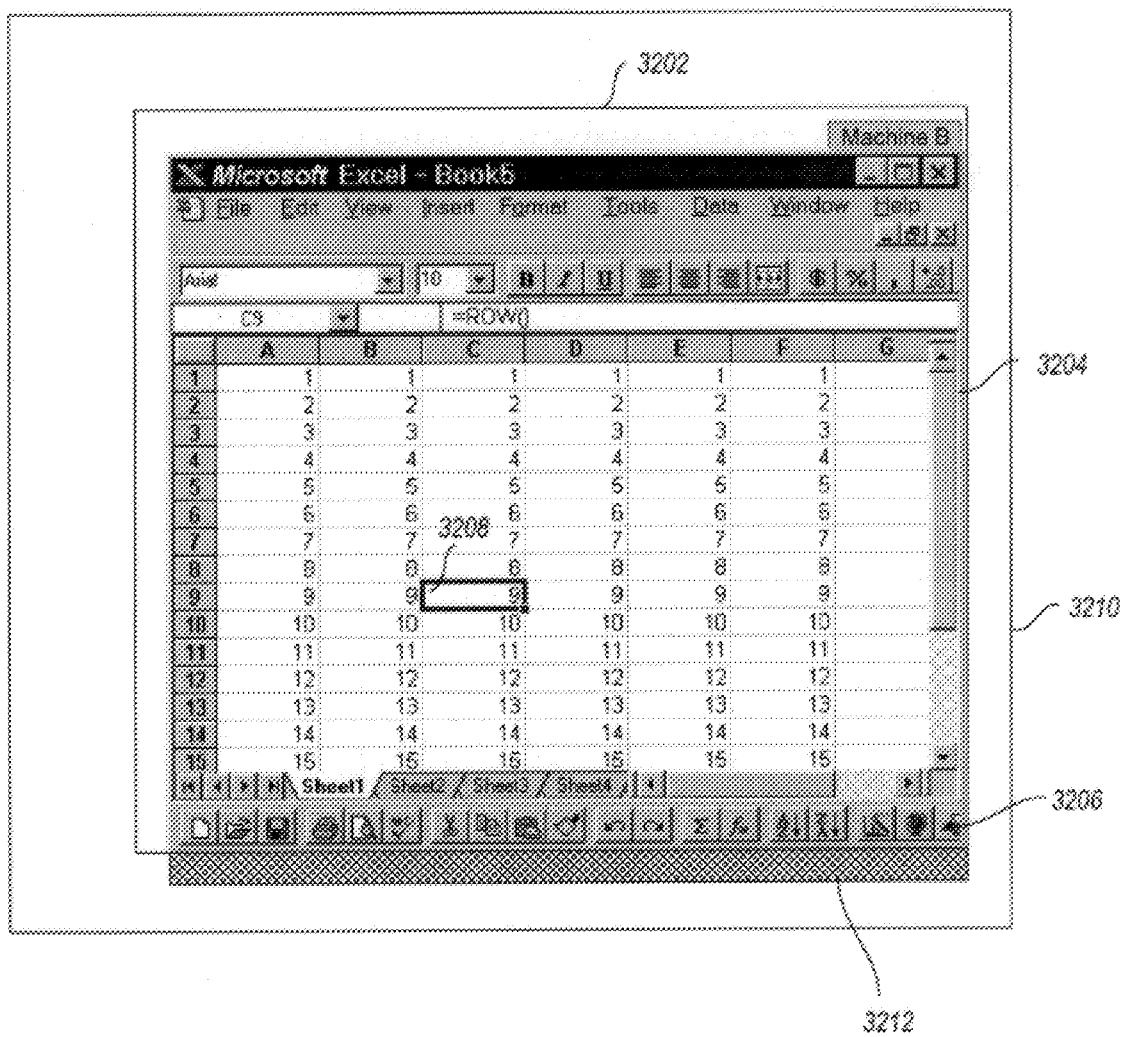

FIG. 31 and FIG. 32 illustrate desktop scrolling. FIG. 31 illustrates a computer system with a larger resolution desktop. The desktop 3102 contains a shared window 3104. FIG. 32 illustrates a computer system with a smaller resolution desktop. The shared window 3204 on the desktop 3202 corresponds to the shared window 3104. However, all of the data in the shared window 3204 is not displayed on the desktop 3202. In particular, the toolbar 3206 is not completely displayed on the desktop 3202. The virtual desktop 3210 is the same size as the desktop 3102 with the larger resolution. The cross hatched region 3212 shows the portion of the window 3204 that does not fit onto the desktop 3202. If a user moves the cursor to the scroll bar 3206, then the Desktop Scroller would reposition the shared window 3204 so that the scroll bar 3206 would be visible. When the scroll bar 3206 is visible, the title bar at the top of the window would be invisible. The Desktop Scroller changes the position by requesting the operating system to move the origin of the shared window 3204 in the X direction a predetermined amount. To change the origin of a window, the Desktop Scroller preferably invokes the SetWindowPos function of the Windows operating system passing the new origin of the window (bracketed by the SWP__BeginShadowWindowMove and the SWP__EndShadowWindowMove messages). The Desktop Scroller may use an origin with negative coordinate values to move the windows. If the position of the cursor is at the edge of the physical desktop, but not at the edge of the virtual desktop, then the predetermined amount is either 10% of the physical desktop size or to the edge of the virtual desktop. The Desktop Scroller also preferably ignores mouse and keyboard events which are within 100 milliseconds of the last scroll to avoid scrolling too frequently. The Desktop Scroller allows a user to select scrolling of all windows or of only shared windows. The user makes a selection through a dialog box provided by the Desktop Scroller. If only the shared windows are to be scrolled, then the Desktop Scroller changes the position of only the shared windows.

After scrolling, the Desktop Scroller notifies the Desktop Scroller of the other computer system of its new viewport origin. The other Desktop Scroller sends the viewport origin to its SWP, which uses the viewport origin to determine the obscured desktop regions as described below.

The Desktop Scroller also performs scroll unwinding. When a user disconnects the computer systems from sharing applications or disables desktop scrolling, the Desktop Scroller unwinds any scrolling of applications that may have occurred. This unwinding places the viewport at coordinates (0,0) of the virtual desktop. The Desktop Scroller keeps track of the cumulative amount that the windows have been scrolled. To unwind, the Desktop Scroller changes the position of each window by the inverse of the cumulative amount. In this way, the viewport is effectively set to the coordinates (0,0) of the virtual desktop.

Figure 34:
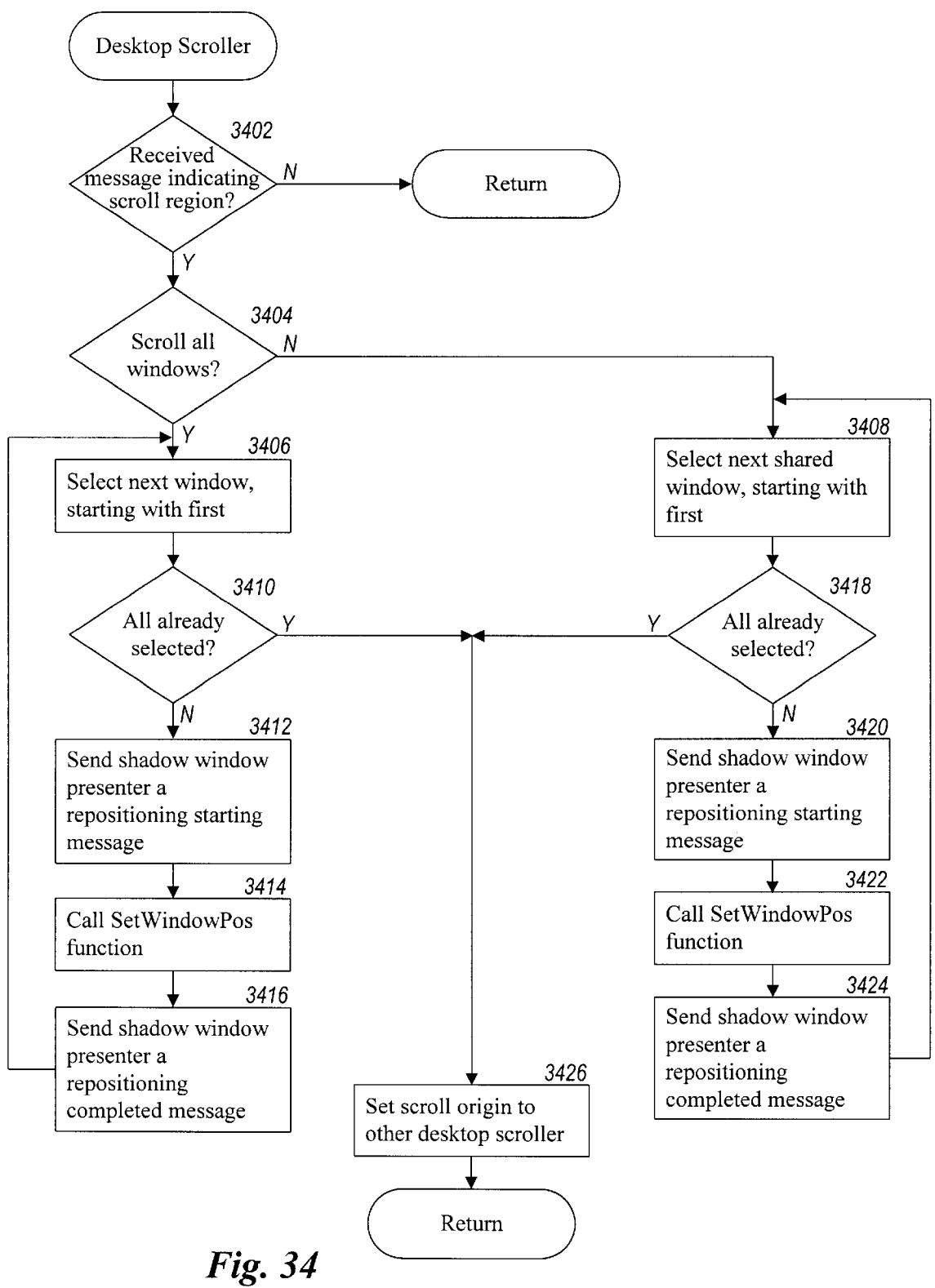
FIG. 34 illustrates an overview flow diagram of the Desktop Scroller routine.

FIG. 34 illustrates an overview flow diagram of the Desktop Scroller routine. The Desktop Scroller routine is invoked by the installed hook upon receiving notification of a mouse or keyboard event. In step 3402, if a received notification indicates movement with a scroll region, then the routine continues at step 3404, else the routine returns. In step 3404, if all windows should be scrolled, then the routine continues at step 3406, else the routine continues at step 3408. In step 3406, the Desktop Scroller routine selects the next window starting with the first. In step 3410, if all the windows have already been selected, then the routine continues at step 3426, else the routine continues at step 3412. In step 3412, the Desktop Scroller routine sends the SWP a repositioning starting message. In step 3414, the Desktop Scroller routine calls the SetWindowPos function of the Windows operating system to reposition the selected window. In step 3416, the Desktop Scroller routine sends the SWP a repositioning completed message. In step 3408, the Desktop Scroller routine selects the next shared window starting with the first. In step 3418, if all shared windows have already been selected, then the routine continues at step 3426, else the routine continues at 3420. In step 3420, the Desktop Scroller routine sends the SWP routine a repositioning starting message. In step 3422, the Desktop Scroller routine calls the SetWindowPos function of the Windows operating system to reposition the selected window. In step 3424, the Desktop Scroller routine sends the SWP routine a repositioning completed message. In step 3426, the Desktop Scroller routine sends the new viewport origin to the computer system with the higher resolution desktop and returns.

Shadow Window Presenter (SWP)

The Shadow Window Presenter (SWP) manages the displaying of the shadow windows. As discussed above, the Share System maintains a memory bitmap that contains the data of the shadow windows. Each shadow window has a corresponding shadow window procedure that handles all messages directed to the shadow window.

Figure 33A:
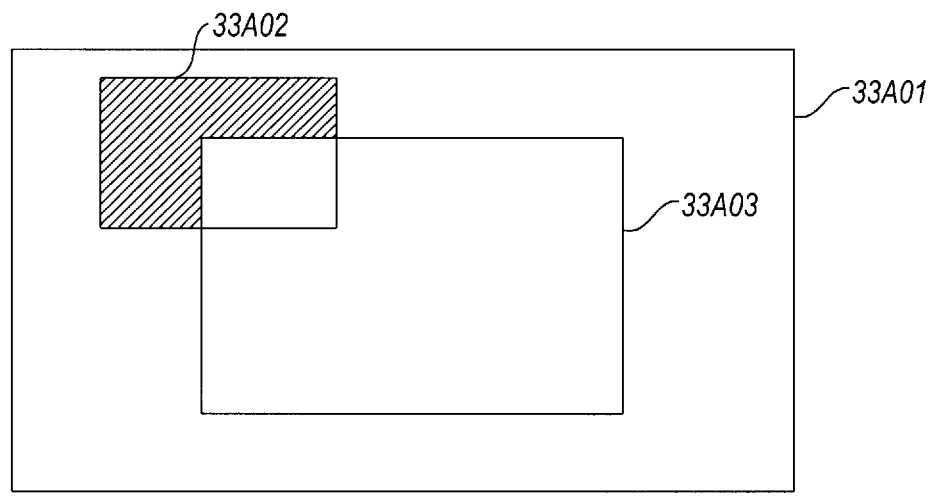
FIGS. 33A and 33B illustrate an obscured desktop region.
Figure 33B:
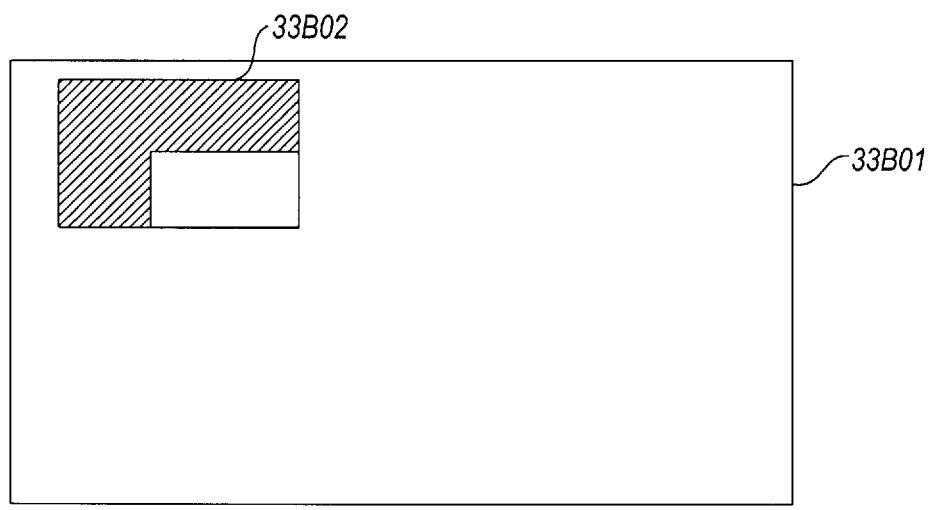

The SWP also manages how to display portions of a shadow window when the corresponding host window is not completely within the viewport of the host computer system. This situation arises when the host computer system has a lower resolution desktop and thus uses desktop scrolling. FIGS. 33A and 33B illustrate an obscured desktop region. An obscured desktop region is a region of a host window that is currently not within the viewport of the host computer system. FIG. 33 illustrates an obscured desktop region. The virtual desktop 3301 contains the host window 3302. The viewport 3303 is the portion of the virtual desktop that is currently displayed on the low resolution display. The shaded portion of the host window 3302 is not currently displayed. Since that portion is not displayed, the Share System does not have access to the current contents of this obscured desktop region. Consequently, the corresponding shadow window does not have the current contents. FIG. 33B illustrates the corresponding shadow window. The corresponding shadow window 33B02 is shown on the higher resolution desktop 33B01. The region of the shadow window 33B02 that corresponds to the obscured desktop region of the host window 3302 is filled with a cross hatch pattern to indicate that its data is not current.

When the resolutions of the desktops are different, the Share System of the computer system with the lower resolution desktop notifies the Share System of the computer system with the higher resolution desktop of the origin of the viewport. The SWP of the computer system with the higher resolution desktop can then determine which regions of its shadow windows correspond to obscured desktop regions and fill such regions with the cross hatch pattern.

The SWP also maintains of list of regions within shadow windows for which it has not yet received data from the host computer system. For example, when a shadow window is first created, the shadow computer system may not have yet received the contents of the host window. Consequently, the bitmap memory in the area corresponding to the shadow window will contain data that is "left over" from a previous shadow window. Nevertheless, the operating system may send a "paint" message to the newly created shadow window. If the shadow window in response to the "paint" message paints the shadow window with the data from the bitmap memory, then the data will be incorrect. Therefore, the SWP uses this list of invalid shadow window regions to suppress the painting of portions of the shadow windows for which data from the host computer system has not yet been received.

Upon receiving a new viewport origin message, the SWP adds to the list of the invalid shadow window regions those previously obscured desktop regions that are now within the viewport. Although previously obscured desktop regions are now visible within the viewport, the shadow computer system may not have yet received the data with which to paint the now visible regions. The SWP also generates a new list of the obscured desktop regions based on the new viewport origin.

The SWP also maintains a list of regions of host windows are obscured by a non-shared application of the host computer system based on the shared window lists that are received.

Upon receiving a call from the SWLM to generate a new window, the SWP issues an appropriate call to the Windows operating system to create a tag window and a shadow window. FIGS. 31 illustrates a host window, and FIG. 32 illustrates the corresponding tag and shadow windows. The desktop 3102 displays the host window 3104, and the desktop 3202 displays the tag window 3303 and the shadow window 3304. The tag window is created for the purpose of displaying the identification of the host machine 3303 in the upper right corner. The SWP will add the region occupied by this new shadow window to the list of invalid shadow window regions. The window procedure for the shadow window will not repaint the window until its regions is removed from the list of invalid shadow window regions. The window procedure for the shadow window will send messages to the tag window to control its placement.

When the shadow computer system eventually receives the data for the host window, the Share System stores the data in the bitmap memory, removes the corresponding region from the list of invalid shadow window regions, and notifies the operating system that the area of the window is invalid. The operating system then send a "paint" message to the shadow window. The shadow window is then painted based on the data in the bitmap memory.

Figure 35:
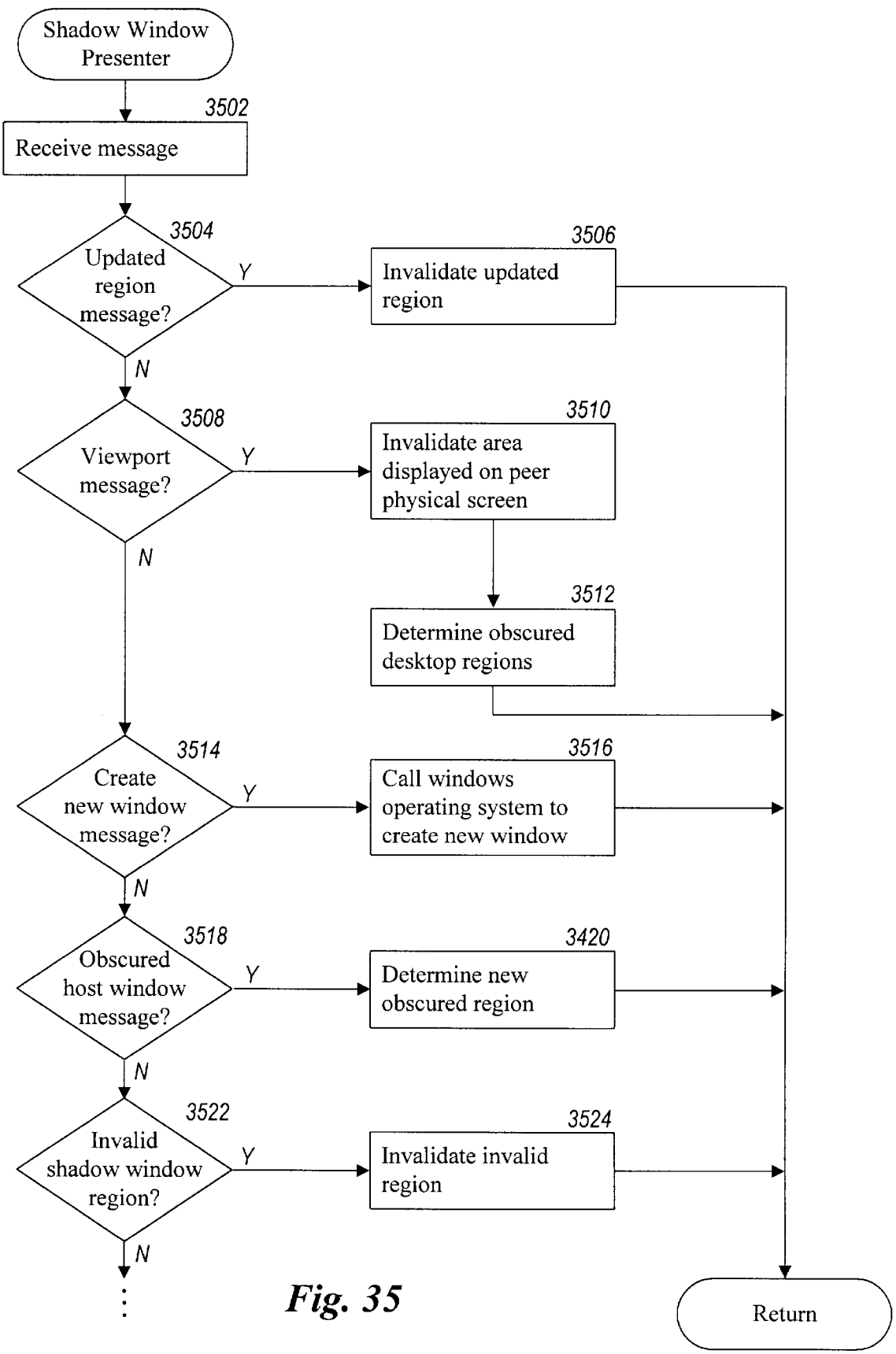
FIG. 35 illustrates an overview flow diagram of the SWP.

FIG. 35 illustrates an overview flow diagram of the SWP. In step 3502, the SWP routine receives a message. In step 3504, if the message is a message to update a region of a shadow window, then the SWP routine continues at step 3506, else the SWP routine continues at step 3508. In step 3506, the SWP routine notifies the operating system that the regions is invalid so that the operating system can send a "paint" message to the appropriate shadow window. In step 3508, if the message is a change in viewport origin message, then the routine continues at step 3510, else the routine continues at step 3514. In step 3510, the SWP routine adds to the list of invalid shadow window regions those regions within the new viewport that were previously obscured desktop regions and sends notifies the operating system that the region corresponding to the viewport is now invalid. In step 3512, the SWP routine generates a list of the newly obscured desktop regions based on the new viewport origin. In step 3514, if the message is a create new window message, the SWP routine continues at step 3516, otherwise the SWP routine continues at step 3518. At step 3516, the SWP routine adds the region of the new window to the invalid shadow window regions and calls the operating system to create a new window. In step 3518, if the message is an obscured host window region message, then the SWP routine continues at step 3520, else the SWP routine continues at step 3522. In step 3520, the SWP routine stores the region in the obscured window region. In step 3522, if the message is an invalid region message, the SWP routine continues at step 3524, otherwise the SWP routine continues to process other messages. In step 3524, the SWP routine stores the invalid region in the list of invalid shadow window regions.

Figure 36:
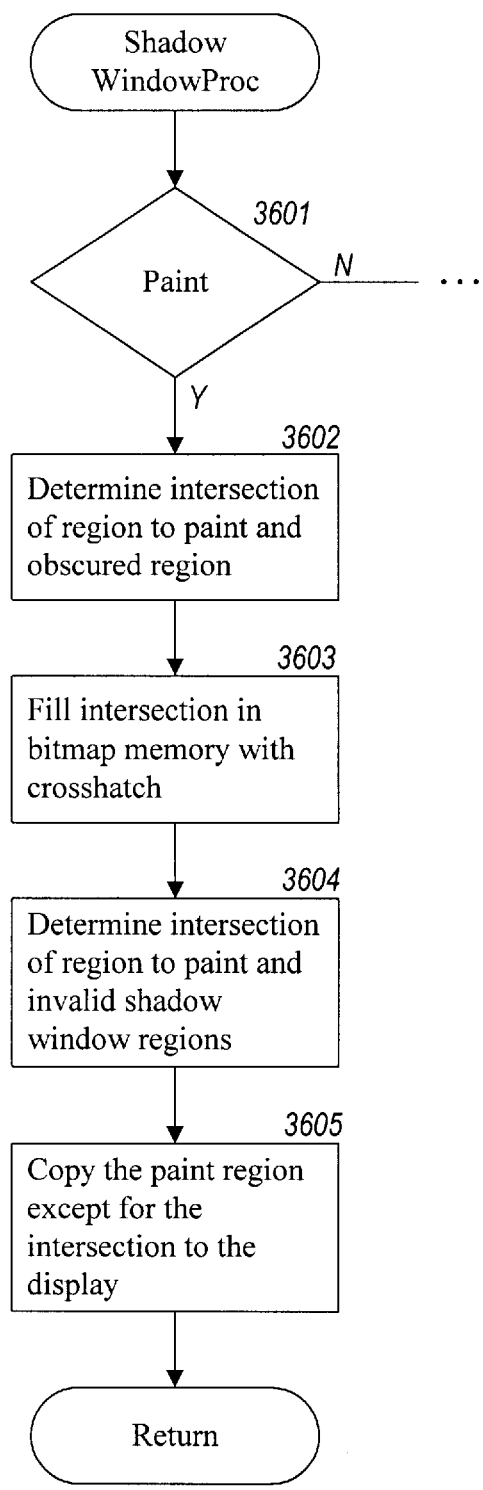
FIG. 36 is a flow diagram of the window procedure for the shadow windows.

Each shadow window has a corresponding window procedure. FIG. 36 is a flow diagram of the window procedure for the shadow windows. In step 3601, if the message is a paint message, then the procedure continues at step 3602, else the procedure processes the message. In step 3602, the procedure determines the intersection of the paint region with the regions in the list of obscured desktop regions and the list of obscured host window regions. In step 3603, the procedure fills the intersection in the bitmap memory with a cross hatch pattern. In step 3604, the procedure determines the intersection of the paint region with the list of invalid shadow window regions. In step 3605, the procedure copies the paint region from the bitmap memory except for the intersection to the display and returns.

Copoerating and Detached Modes

When two computer systems are in cooperating mode, then each of them is either in control of the shared application or viewing the shared applications. That is, while in cooperating mode, neither the computer systems may use local applications. However, to exit cooperating mode, a local application may be selected with a mouse click in that local application's window. In addition, local applications may be used while the computer system is in detached mode. In detached mode, a user may use local applications and view shared applications. The computer system that is in detached mode may not gain control of shared applications hosted on another system. Similarly, other users cannot gain control of applications hosted on the detached system. A user may enter a detached mode by selecting a detached mode button displayed on the desktop. Similarly, a user may enter a cooperate mode by selecting a cooperate mode button displayed on the desktop.

Active Window Coordinator (AWC)

In order to maintain the correspondence between the desktops of computer systems that are sharing an application, the active window on each computer system should be the same. The active window is a window which currently receives the mouse and keyboard input. The Active Window Coordinator (AWC) are responsible for ensuring that the active windows are the same. The AWC periodically determines whether or not the host active window has changed. To make this determination, the AWC calls an operating system function to determine the currently active window. If the active window has changed, the AWC notifies the AWC of the other computer system. The AWC of the other computer system changes its active window accordingly. Similarly, when a window is activated, restored, or closed, the operating system notifies the AWC of the change. Upon receiving the notification, the AWC immediately sends a message to the AWC of the other computer system indicating the change. Upon receiving the message, the other AWC perform the corresponding operation.

In addition, the AWC notifies its SWLM that the z-order of the windows should be updated. For example, if a new host window has been activated, it would be first in the shared window z-order at the host computer system. Similarly, the corresponding shadow window which is activated at the shadow computer system should be first in its shared window z-order.

Control Arbitrator

In order to provide input to a shared application, a user first gains control of the shared application. The control arbitrator manages the negotiation of who may obtain control of a shared application. In order to obtain control of a shared application, a user may enter mouse input (i.e., a mouse click) or keyboard input (other than an Escape character). When the host computer system is in control of a shared application, a user at the shadow computer system may request control of the shared application by entering the mouse click or keyboard input. The shadow control arbitrator then receives the user's input and sends a message to the host control arbitrator requesting control of the shared application. In a preferred embodiment of the present invention, the host control arbitrator returns a message granting control to the shadow control arbitrator. At that point, the user at the shadow computer system may provide input to the shared application. Similarly, when the shadow computer system is in control of a shared application, the host computer system may gain control of the shared application.

In addition, the control arbitrator component maintains whether or not a user is in detached mode. A user at a host computer system may choose to enter detached mode by selecting a detached mode button which is provided on the host desktop. When the user selects detached mode, the host control arbitrator component sets the control state to be detached mode. In addition, the host control arbitrator component notifies the shadow control arbitrator component that it has entered detached mode. When a host computer system has entered detached mode, then the shadow computer system may not provide input to shared applications which are hosted on the host computer system. In addition, while in detached mode, a user at the host computer system may only access local applications and shared applications which are hosted at the host computer system.

Although the present invention has been described in terms of the preferred embodiment, it is not intended that the invention be limited to this embodiment. Modification within the spirit of the invention will be apparent to those skilled in the art. The scope of the present invention is defined by the claims which follow.

We claim:

1. A method in a computer system for resolving display resolution differences between a host computer system and a shadow computer system, the host computer system for executing a shared application that displays output, the output being displayed on both a host display of the host computer system and a shadow display of the shadow computer system, the host display having a host display resolution and the shadow display having a shadow display resolution, the method comprising steps of:

determining whether the host display resolution or the shadow display resolution is higher; and simulating the determined higher display resolution on the computer system with the lower display resolution by establishing a virtual display with the higher display resolution, by displaying a viewport of the lower display resolution into the virtual display, and by scrolling the viewport to reflect a current cursor position within the display with the higher display resolution.

2. The method of claim 1 wherein the simulating of the higher display resolution on the computer system with the lower display resolution includes automatically scrolling the viewport when the current cursor position moves within a predetermined distance from an edge of the viewport.

3. The method of claim 1 wherein the simulating of the higher display resolution on the computer system with the lower display resolution includes scrolling the viewport by an amount that is 10% of the viewport.

4. The method of claim 1 wherein a window is displayed in the virtual display, the window having an origin, and wherein the scrolling includes repositioning the origin within the virtual display.

5. The method of claim 4 wherein the window is a shared window.

6. The method of claim 4 wherein the window is a non-shared window.

7. The method of claim 1 wherein a plurality of shared windows are displayed in the virtual display, each shared window having an origin and wherein the scrolling includes repositioning the origin of each shared window.

8. The method of claim 1 wherein a shared window and a non-shared window are displayed in the virtual display and wherein the scrolling includes scrolling both the shared and non-shared windows.

9. The method of claim 1 wherein a shared window and a non-shared window are displayed in the virtual display and wherein the scrolling includes scrolling only the shared window.

10. The method of claim 1 wherein a shared window and a non-shared window are displayed in the virtual display and wherein the scrolling includes scrolling the shared window and based on a setting of an indicator, scrolling the non-shared window.

11. The method of claim 10 wherein the indicator is set by prompting a user to select whether the non-shared window is to be scrolled along with the shared window.

12. The method of claim 1 wherein the computer system with the lower display resolution notifies the computer system with the higher display resolution when the viewport is scrolled.

13. She method of claim 12 wherein the computer system with the higher display resolution uses the notification to determine an obscured portion of a window.

14. The method of claim 1 wherein the computer system with the lower display resolution tracks the scrolling of the viewport so that unwinding of the scrolling may be performed.

15. The method of claim 14 wherein the unwinding of the scrolling includes scrolling the viewport by an inverse of a cumulative amount of the scrolling.

16. The method of claim 15 wherein the virtual display includes a window with an origin and the scrolling of the viewport by the inverse of the cumulative amount of the scrolling includes repositioning the origin of the window by the inverse of the cumulative amount of the scrolling.

17. A system for resolving display resolution differences between a first computer system and a second computer system, the first computer system having a first display with a first display resolution, the second computer system having a second display with a second display resolution, comprising:

a component that determines whether the first display resolution or the second display resolution is higher; and a component that simulates the determined higher display resolution on the computer system with the lower display resolution by establishing a virtual display with the higher display resolution, by displaying a viewport of the lower display resolution into the virtual display, and by scrolling the displayed viewport to reflect a current cursor position within the display with the higher display resolution.

18. The system of claim 17 including a component that detects movement of a cursor and that automatically scrolls the displayed viewport when movement of the cursor is detected into a region near En edge of the displayed viewport.

19. The system of claim 18 wherein the component that detects movement of the cursor disregards detected movement based on time between the detected movement and previously detected movement.

20. The system of claim 19 wherein the component that detects movement of the cursor disregards the detected movement when the time is less than 100 milliseconds.

21. The system of claim 17 wherein the component that simulates the higher display resolution on the computer system with the lower display resolution includes scrolling the viewport by an amount that is approximately 10% of the displayed viewport.

22. The system of claim 17 wherein the component that simulates the higher display resolution on the computer system with the lower display resolution scrolls the displayed viewport by repositioning each window displayed in the virtual display.

23. The system of claim 17 wherein the component that simulates the higher display resolution on the computer system with the lower display resolution notifies the computer system with the higher display resolution when the displayed viewport is scrolled.

24. The system of claim 23 wherein the computer system with the higher display resolution uses the notification to determine an obscured portion of a window.

25. The system of claim 17 wherein the component that simulates the higher display resolution on the computer system with the lower display resolution tracks the scrolling of the displayed viewport so that unwinding of the scrolling may be performed.

26. The system of claim 25 wherein the unwinding of the scrolling includes scrolling the displayed viewport by an inverse of a cumulative amount of the scrolling.

27. The system of claim 26 wherein the virtual display includes a window with all origin and the unwinding of the scrolling includes repositioning the origin of the window by the inverse of the cumulative amount of the scrolling.

* * * * *

UNITED STATES PATENT AND TRADEMARK OFFICE
CERTIFICATE OF CORRECTION

PATENT NO. : 5,874,960
DATED : February 23, 1999
INVENTOR(S) : Mairs et al.

It is certified that error appears in the above-identified patent and that said Letters Patent is hereby corrected as shown below:

<u>Title page</u>,
Item [57], ABSTRACT,
Line 4, "systems The" should read -- system. The --.

<u>Column 7</u>,
Line 6, "The controlling..." should not begin a new paragraph.

<u>Column 21</u>,
Line 29, "She" should read -- The --.

<u>Column 22</u>,
Line 12, "En" should read -- an --.

Signed and Sealed this

Twenty-ninth Day of June, 2004

JON W. DUDAS
*Acting Director of the United States Patent and Trademark Office*